(12) United States Patent
Donnelly et al.

(10) Patent No.: US 12,234,775 B2
(45) Date of Patent: Feb. 25, 2025

(54) ROTOR BOW MITIGATION

(71) Applicant: ROLLS-ROYCE plc, London (GB)

(72) Inventors: David M. Donnelly, Bristol (GB); Derek S. Wall, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/349,285

(22) Filed: Jul. 10, 2023

(65) Prior Publication Data
US 2024/0093645 A1    Mar. 21, 2024

(30) Foreign Application Priority Data

Jul. 28, 2022 (GB) .................................... 2211020

(51) Int. Cl.
| | |
|---|---|
| F02C 7/268 | (2006.01) |
| F01D 15/10 | (2006.01) |
| F01D 25/34 | (2006.01) |
| F01D 25/36 | (2006.01) |
| F02C 9/00 | (2006.01) |
| F01D 21/00 | (2006.01) |

(52) U.S. Cl.
CPC .............. *F02C 7/268* (2013.01); *F01D 15/10* (2013.01); *F01D 25/34* (2013.01); *F01D 25/36* (2013.01); *F02C 9/00* (2013.01); *F01D 21/00* (2013.01); *F05D 2260/80* (2013.01); *F05D 2260/85* (2013.01); *F05D 2260/941* (2013.01); *F05D 2270/303* (2013.01)

(58) Field of Classification Search
CPC .......... F02C 7/268; F01D 25/34; F01D 25/36; F01D 15/10; F01D 21/00; F01D 21/06; D01D 21/00; D01D 21/06
See application file for complete search history.

(56) References Cited

U.S. PATENT DOCUMENTS

| | | | |
|---|---|---|---|
| 2016/0097328 A1 | 4/2016 | Wintgens et al. | |
| 2018/0372003 A1* | 12/2018 | Hon | F01D 25/36 |
| 2020/0400036 A1 | 12/2020 | Redford et al. | |
| 2021/0301677 A1* | 9/2021 | Tomescu | F01D 19/02 |
| 2021/0301732 A1 | 9/2021 | Tomescu | |

FOREIGN PATENT DOCUMENTS

| | | |
|---|---|---|
| EP | 3205859 A1 | 8/2017 |
| EP | 3266989 A1 | 1/2018 |
| EP | 3318727 A1 | 5/2018 |
| EP | 3686402 A1 | 7/2020 |

OTHER PUBLICATIONS

Extended Partial Search Report from counterpart European Application No. 23183207.2 dated Apr. 22, 2024, 12 pp.
Great Britain search report dated Jan. 16, 2023, issued in GB Patent Application No. 2211020.9.
Extended Search Report from counterpart European Application No. 23183207.2 dated Jul. 22, 2024, 14 pp.

\* cited by examiner

*Primary Examiner* — Kyle Robert Thomas
(74) *Attorney, Agent, or Firm* — Shumaker & Sieffert, P.A.

(57) ABSTRACT

There is disclosed a gas turbine engine comprising: an electrically-powered motor configured to rotate a driven spool of the gas turbine engine; a primary controller configured to conduct a primary function using the motor; and a bow controller configured to selectively control the motor to perform a rotor bow mitigation operation in which the motor drives the driven spool to rotate to mitigate a non-uniform thermal distribution in a rotor of a spool of the gas turbine engine.

18 Claims, 11 Drawing Sheets

510

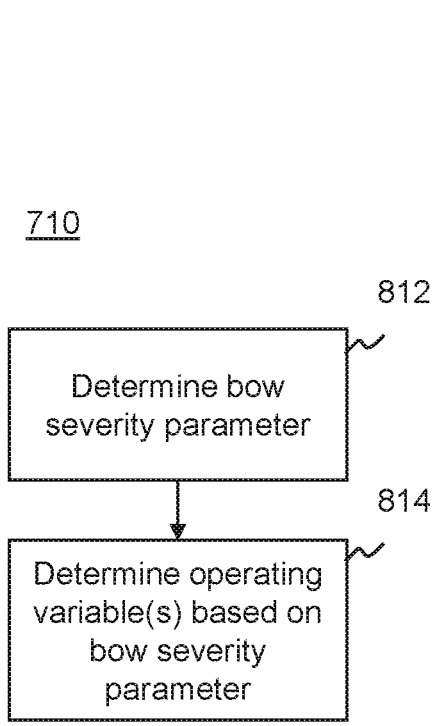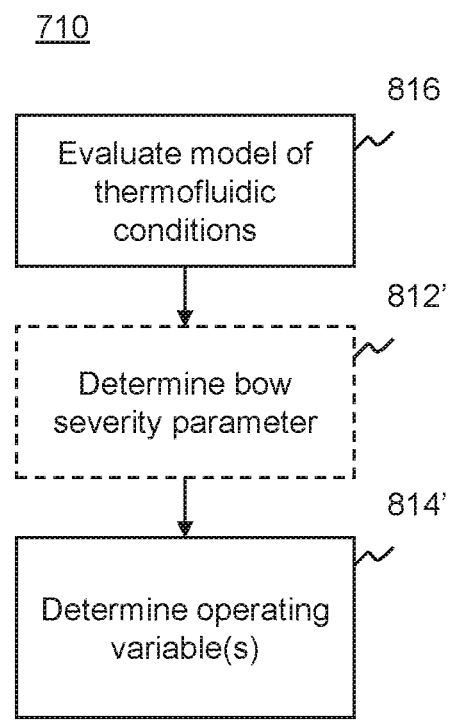
FIG. 8a
FIG. 8b

ROTOR BOW MITIGATION

CROSS-REFERENCE TO RELATED APPLICATIONS

This specification claims the benefit of UK Patent Application No. GB 2211020.9, filed on 28 Jul. 2022, which is hereby incorporated herein in its entirety.

BACKGROUND

Technical Field

This disclosure concerns a gas turbine engine comprising a bow controller for mitigating a non-uniform thermal distribution in a rotor of a spool of the gas turbine engine.

Description of the Related Art

Rotor bow is a known phenomenon in gas turbine engines by which a non-uniform thermal distribution arises in the gas turbine engine and causes a non-uniform thermal expansion of a rotary component. The rotary component may be a spool of the gas turbine engine or any component of the spool, such as a rotor assembly (e.g. a turbine blade or compressor blade assembly) or a shaft.

It is known that a non-uniform thermal distribution may arise when a gas turbine is shutdown owing to convection currents within the gas turbine engine. It is known to mitigate rotor bow by rotating a spool of the engine.

Rotation operations to mitigate rotor bow may delay operational usage of a gas turbine engine, and it is therefore desirable to minimise a time taken for such operations. Rotation operations to mitigate rotor bow may also consume non-time resources and so it is desirable to minimise or best manage use of such resources.

SUMMARY

According to a first aspect of the present disclosure, there is disclosed a gas turbine engine comprising:
 an electrically-powered motor configured to rotate a driven spool of the gas turbine engine;
 a primary controller configured to conduct a primary function using the motor, the primary function selected from the group consisting of:
  a gas turbine start operation in which the motor drives the driven spool to rotate to an ignition speed for engine ignition;
  power generation for powering an airframe pressurization system of the gas turbine engine, where the motor is a compound motor and generator;
  power generation for transferring power to an airframe system, where the motor is a compound motor and generator;
 a bow controller configured to selectively control the motor to perform a rotor bow mitigation operation in which the motor drives the driven spool to rotate to mitigate a non-uniform thermal distribution in a rotor of a spool of the gas turbine engine;
 wherein the rotor bow mitigation operation is variable, and wherein the bow controller is configured to determine one or more operating variables of the rotor bow mitigation operation based on one or more physical parameters relating to a thermal condition of the gas turbine engine, and/or based on one or more operational parameters relating to the gas turbine engine.

The expression "physical parameter" is intended to refer to a parameter related to a thermal condition of the engine or environment that can be monitored (a "monitored physical parameter" or modelled ("a derived physical parameter"). Unless expressly indicated, each physical parameter referred to in this disclosure may be monitored (i.e., using one or more sensors) or derived, for example using a model of thermofluidic conditions of the gas turbine engine as evaluated by the bow controller. A physical parameter as defined herein may otherwise be defined by reference to sub-categories of the parameters, including, a thermofluidic parameter (e.g., monitored and/or derived), a derived deflection parameter, or a bow diagnostic parameter.

It may be that the motor is disposed: radially inwardly of an annular core flow path of the gas turbine engine; or radially inwardly of an annular flow path through a fan of the gas turbine engine, and forward of the annular core flow path.

Alternatively, the motor may be disposed radially outwardly of the annular core flow path. For example, the motor may be disposed within a core fairing between the annular core flow path and an annular bypass flow path.

It may be that the bow controller is configured to monitor one or more bow diagnostic parameters relating to a manifestation of a rotor bow state. It may be that the bow controller is configured to determine one or more operating variables of the rotor bow mitigation operation based on the bow diagnostic parameter.

It may be that the or each bow diagnostic parameter is selected from a group consisting of: a vibration parameter relating to vibration of a component of the gas turbine engine; a parameter relating to power or torque of the motor, for rotation of the driven spool; and a physical deflection parameter corresponding to a monitored deflection of a spool of the gas turbine engine.

It may be that the bow controller is configured to determine a bow severity parameter based on one or more physical parameters relating to a thermal condition of the gas turbine engine; wherein the bow severity parameter corresponds to a predicted severity of a rotor bow state of a spool of the gas turbine engine, and wherein the bow controller is configured to determine the one or more operating variables based on the bow severity parameter.

The bow severity parameter may correspond to a thermal distribution in the gas turbine engine affecting a spool of the gas turbine engine. The bow severity parameter may correspond to a temperature difference local to a component of a spool of the gas turbine engine between opposing sides of a rotation axis of the component.

It may be that the bow controller is configured to: evaluate a model of thermofluidic conditions in the gas turbine engine based on one or more physical parameters relating to a thermal condition of the gas turbine engine; and determine a derived thermofluidic or deflection parameter relating to a rotor bow state based on the model; and determine the one or more operating variables of the rotor at least partly based the derived thermofluidic or deflection parameter.

It may be that the bow controller is configured to evaluate the model to determine a derived thermofluidic or deflection parameter selected from the group consisting of: a predicted temperature difference relating to bow of a spool of the gas turbine engine; a predicted deflection parameter relating to bow of a spool of the gas turbine engine, for example a predicted deflection or an induced load owing to a non-uniform thermal distribution in the gas turbine engine.

For example, the predicted temperature difference may be a temperature difference between diametrically opposing (i.e., in opposing relationship over a rotational axis of the spool, but not necessarily at the diametrical extremes of the component) portions of a component of the spool of the gas turbine engine. The temperature difference may relate to predicted temperatures of the component, or predicted temperatures of air in the respective zone or zones.

It may be that the bow controller is configured to determine a bow severity parameter at least partly based on the derived thermofluidic or deflection parameter, the bow severity parameter corresponding to a predicted severity of a rotor bow state of a spool of the gas turbine engine; and wherein the bow controller is configured to determine the operating variable based on the bow severity parameter.

The or each physical parameter may be selected from a group of thermofluidic parameters and/or a group of bow diagnostic parameters, respectively consisting of:

thermofluidic parameters:
- a compressor entry and/or or exit temperature;
- a turbine entry and/or exit temperature;
- a compressor and/or or turbine blade or vane temperature;
- a combustion chamber discharge temperature;
- a bypass duct temperature;

an engine spool temperature;
- a lubricant temperature;
- a fuel temperature;
- a coolant temperature;
- a wind speed at a location for the rotor bow mitigation operation;
- a wind direction at a location for the rotor bow mitigation operation;
- a windmilling rotational speed of a spool of the gas turbine engine;
- a humidity at a location for the rotor bow mitigation operation;
- an ambient temperature at a location for a rotor bow mitigation operation;
- an engine inlet temperature relating to air provided to an inlet of the gas turbine engine;
- an engine inlet pressure relating to air provided to an inlet of the gas turbine engine;
- a pressure parameter relating to air flow through the gas turbine engine;
- a set of pressure parameters corresponding to axially distributed locations through the gas turbine engine;
- a set of temperature parameters corresponding to axially distributed locations through the gas turbine engine
- a flow rate parameter relating to air flow through the gas turbine engine;
- an engine bay temperature, wherein the gas turbine engine is for installation in an engine bay;
- a predicted temperature difference relating to bow of a spool of the gas turbine engine;
- a predicted deflection parameter relating to bow of a spool of the gas turbine engine, for example a predicted deflection or an induced load owing to a non-uniform thermal distribution in the gas turbine engine; and bow diagnostic parameters:
- a vibration parameter relating to vibration of a component of the gas turbine engine;
- a parameter relating to power or torque of the motor, for rotation of the driven spool; and
- a physical deflection parameter corresponding to a monitored deflection of a spool of the gas turbine engine.

It may be that the bow controller is configured to communicate with a thermal management controller of the gas turbine engine to receive one or more of the at least one physical parameters. It may be that one or more of the at least one physical parameter is determined by monitoring using a respective a sensor of the gas turbine. It may be that one or more of the at least one physical parameter is derived from a model of thermofluidic conditions of the gas turbine engine, for example a thermal model based on operational parameters associated with the gas turbine engine and/or one or more monitored or derived physical parameters of the gas turbine engine.

It may be that the one or more operating variables are determined at least partly based on one or more operational parameters relating to engine health, an operating history, an operating schedule, operating resources at a location for a rotor bow mitigation operation, and energy storage resources for a rotor bow mitigation operation.

The one or more operational parameters may be selected from the group consisting of:
- a parameter from an engine health monitoring system relating to a degradation or performance metric of a component associated with a spool of the gas turbine engine;
- a parameter relating to maintenance history of the gas turbine engine;
- a parameter relating to a history of rotor bow events of the gas turbine engine and/or an associated fleet of gas turbine engines;
- a parameter relating to maintenance service availability at a location for the rotor bow mitigation operation;
- a parameter indicating an operating state of the gas turbine engine, wherein the operating state is selected from: an in-flight state, a descent state, an approach state, a taxi state, a ground idle state and a shutdown state,
- a time duration associated with an operating state of the gas turbine engine, wherein the operating state is selected from: an in-flight state, a descent state, an approach state, a taxi state, a ground idle state and a shutdown state;
- a time duration associated with operation at a predetermined thermal condition, wherein the thermal condition is defined by maintenance of a monitored temperature within a predetermined range;
- an elapsed time since operation at a predetermined thermal condition, wherein the thermal condition is defined by maintenance of a monitored temperature within a predetermined range;
- a time until a scheduled engine start operation;
- a parameter relating to availability of an external power supply at a location for the rotor bow mitigation operation;
- a parameter indicating a status of connection to an external power supply;
- an energy parameter comprising at least one of: a charge of an energy storage device for the motor, and a discharge capacity of the energy storage device.

The output of the engine health monitoring system may relate to a degradation or performance metric of a component associated with a spool of the gas turbine engine for which the rotor bow mitigation operation is provided (i.e. to mitigate a non-uniform thermal distribution in a rotor of the spool).

It may be that the gas turbine engine is configured to draw power from an energy storage device for the rotor bow mitigation operation, and wherein the bow controller is configured to determine one or more operating variables of the rotor bow mitigation operation based on one or more energy parameters relating to the energy storage device; wherein the energy parameter comprises at least one of: a charge of the energy storage device, and a discharge capacity of the energy storage device; and wherein the bow controller is configured to determine the one or more operating variables of the rotor bow mitigation operation by selecting between a plurality of sets of one or more predetermined operating variables associated with different rates of power consumption, based on the energy parameter.

The charge of the energy storage device may be an expendable charge of the energy storage device, corresponding to the total charge of the energy storage device minus a reserve amount reserved for other energy demand loads of the energy storage device (e.g., higher priority loads).

It may be that the gas turbine engine is configured to draw power from an energy storage device for the rotor bow mitigation operation. It may be that the bow controller is configured to: determine a predicted energy demand for the rotor bow mitigation operation. It may be that a controller of the gas turbine engine is configured to: selectively operate or maintain the gas turbine engine in a power generation state to provide the energy storage device with sufficient charge to meet the predicted energy demand for the rotor bow mitigation operation; and permit or cause transition from the power generation state to a bow mitigation state or shutdown state of the gas turbine engine responsive to determining that the energy storage device has sufficient charge to meet the predicted energy demand for the rotor bow mitigation operation.

It may be that the controller is configured to cause shutdown of the gas turbine engine by controlling a fuel shutoff valve that controls fuel supply to a combustor of the gas turbine engine.

The energy storage controller may be configured so that the determinations of sufficient charge relate to sufficient expendable charge. An expendable charge of the energy storage device corresponds to the total charge of the energy storage device minus a reserve amount reserved for other energy demand loads of the energy storage device (e.g., higher priority loads).

It may be that the energy storage controller is configured to determine the predicted energy demand for the rotor bow mitigation operation based on one or more operating variables of the rotor bow mitigation determined by the bow controller as described above. For example, the bow controller may evaluate a model according to any statement above to determine one or more operating variables of the rotor bow mitigation operation, and the predicted energy demand may be determined based on the one or more operating variables.

It may be that the gas turbine engine comprises the energy storage device. It may be that the gas turbine engine is configured to draw power from an energy storage device of an airframe or other installation to which the gas turbine engine is provided. It may be that the bow controller is configured to receive a signal from the airframe or other installation in order to determine the energy parameter.

The bow controller may be configured to switch from utilizing an energy storage device to using an external power source (optionally in conjunction with the energy storage device, depending on an energy demand), upon determining that an external power source has been connected.

The one or more operating variables of the rotor bow mitigation operation to be determined by the bow controller comprises at least one operating variable selected from the group consisting of:
- a duration of the rotor bow mitigation operation;
- a duration of a continuous phase of the rotor bow mitigation operation;
- a duration of an intermittent phase of the rotor bow mitigation operation;
- an acceptance parameter defining an acceptance criterion for termination of the rotor bow mitigation operation or a phase of the rotor bow mitigation operation;
- a rotation state selectable from continuous and intermittent;
- a frequency of intermittent rotation;
- a turning angle of intermittent rotation;
- a rotational speed or power for intermittent rotation;
- a rotational speed for continuous rotation;
- a power for continuous rotation;
- a parameter defining a tapering profile of rotational speed or power for continuous rotation;
- a parameter defining a tapering frequency of intermittent rotation.

It may be that the bow controller is configured to determine the one or more operating variables of the rotor bow mitigation operation by selecting between predetermined sets of one or more operating variable for the bow mitigation operation, including:
- a baseline set; and
- a time priority set defined to promote relatively faster rotor bow mitigation at a relatively higher rate of power consumption compared to the baseline set; and/or
- an energy priority set defined to cause a relatively lower net power consumption of a rotor bow mitigation operation compared to the baseline set; and/or
- an engine health priority set to enhance a rotor bow mitigation effect relative to the baseline set.

It may be that the engine health priority set is configured to enhance a rotor bow mitigation effect by defining one or more operating variables of the rotor bow mitigation operation to cause relatively more energy expenditure before terminating the rotor bow mitigation operation and/or to define one or more operating variables of the rotor bow mitigation so that an acceptance criterion or acceptance criteria for terminating the rotor bow operation differs from the baseline set to enhance rotor bow mitigation.

It may be that the bow controller is configured to select the time priority set based on an operational parameter relating to a time until a scheduled engine start operation.

It may be that the bow controller is configured to select the energy priority set consumption based on an energy parameter relating to an energy storage device for the rotor bow mitigation operation and/or an operational parameter relating to a time until a scheduled engine start operation. It may be that the bow controller is configured to select the engine health priority set.

It may be that the bow controller is configured to select the time priority set based on an operational parameter relating to a time until a scheduled engine start operation. The bow controller may be configured to select the energy priority set based on an energy parameter relating to an energy storage device for the rotor bow mitigation operation and/or an operational parameter relating to a time until a scheduled engine start operation. The bow controller may be configured to select the engine health priority set based on an operational parameter relating to a maintenance history of the gas turbine engine, a parameter relating to maintenance service availability at a location for the rotor bow mitigation operation, and/or a parameter relating to a history of rotor bow events of the gas turbine engine and/or an associated fleet of gas turbine engines.

It may be that the bow controller is configured to determine termination of the rotor bow mitigation operation based on evaluating a rotor bow acceptance criterion or rotor bow acceptance criteria. The bow controller may be configured to evaluate the rotor bow acceptance criterion or criteria based on one or more of: a physical parameter relating to a thermal condition of the gas turbine engine, an operational parameter relating to the gas turbine engine, an energy parameter relating to an energy storage device for the rotor bow mitigation operation; a bow diagnostic parameter, and a bow severity parameter determined by the bow controller.

The physical parameter may be selected from the group listed above. The operational parameter may be selected from the group listed above. The energy parameter may be as defined above. The bow diagnostic parameter may be selected from the group listed above. The bow severity parameter may be determined by evaluation of a model as described above.

It may be that the bow controller is configured to determine when to terminate a phase of the rotor bow mitigation operation based on monitoring a bow diagnostic parameter (or a derived parameter), for example during the rotor bow mitigation operation. Termination of a phase of the rotor bow mitigation operation may correspond to commencement of a further phase of the rotor bow mitigation operation, for example to terminate a first phase in which an operating variable of the rotor bow mitigation operation has a first value and a second phase in which an operating variable of the rotor bow mitigation operation has a second value. For example, in a first phase an operating variable for a rotation state may be "continuous", and in a second phase the operating variable for a rotation state may be "intermittent" with a frequency of 1 rotation operation every 5 minutes. It may be that the bow controller is configured to determine when to terminate the rotor bow mitigation operation based on monitoring the bow diagnostic parameter (or a derived parameter) during the rotor bow mitigation operation.

The bow controller may be configured so that an acceptance parameter of the rotor bow acceptance criterion or rotor bow acceptance criteria is variable to vary a minimum duration or power consumption of the rotor bow mitigation operation. The bow controller may be configured to:
  vary the acceptance parameter to reduce the minimum duration based on an operational parameter relating to a time until a scheduled engine start operation;
  vary the acceptance parameter to reduce the power consumption based on an energy parameter relating to an energy storage device for the rotor bow mitigation operation;
  vary, and/or determine to permit or deny variation of, the acceptance parameter based on a parameter relating to maintenance history of the gas turbine engine, a parameter relating to a maintenance service availability at a location for the rotor bow mitigation operation, and/or a parameter relating to a history of rotor bow events of the gas turbine engine and/or an associated fleet of gas turbine engines.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to a further aspect of the present disclosure, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which:

FIG. 8a is a flow chart for evaluating a relationship or model to determine one or more operating variables;

FIG. 8b is a flow chart for evaluating a relationship or model to determine one or more operating variables;

DETAILED DESCRIPTION

FIG. 1

Figure 1:
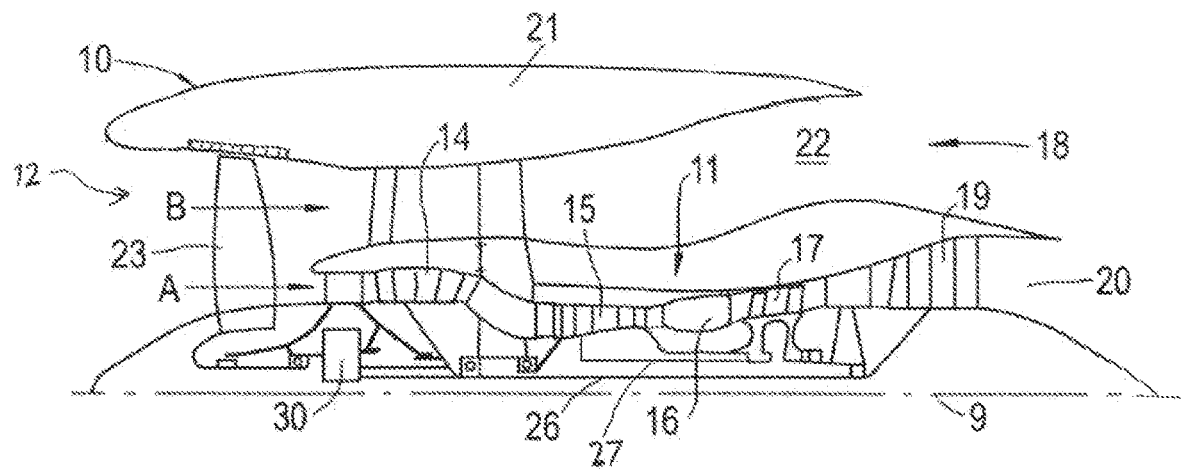
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

FIG. 2

Figure 2:
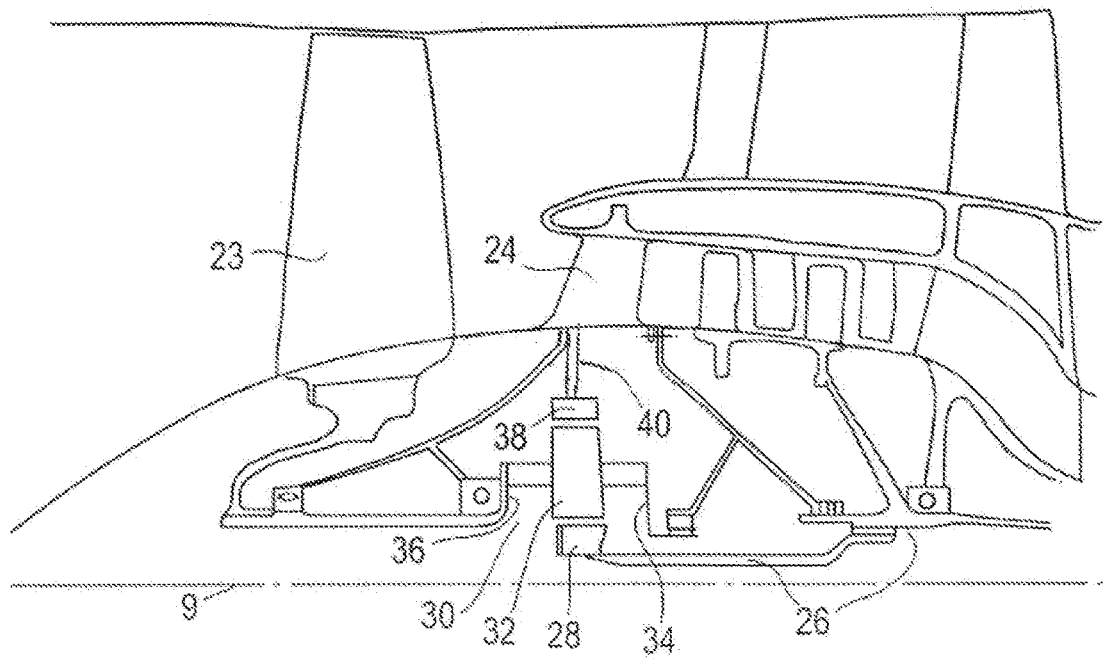
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

FIG. 3

Figure 3:
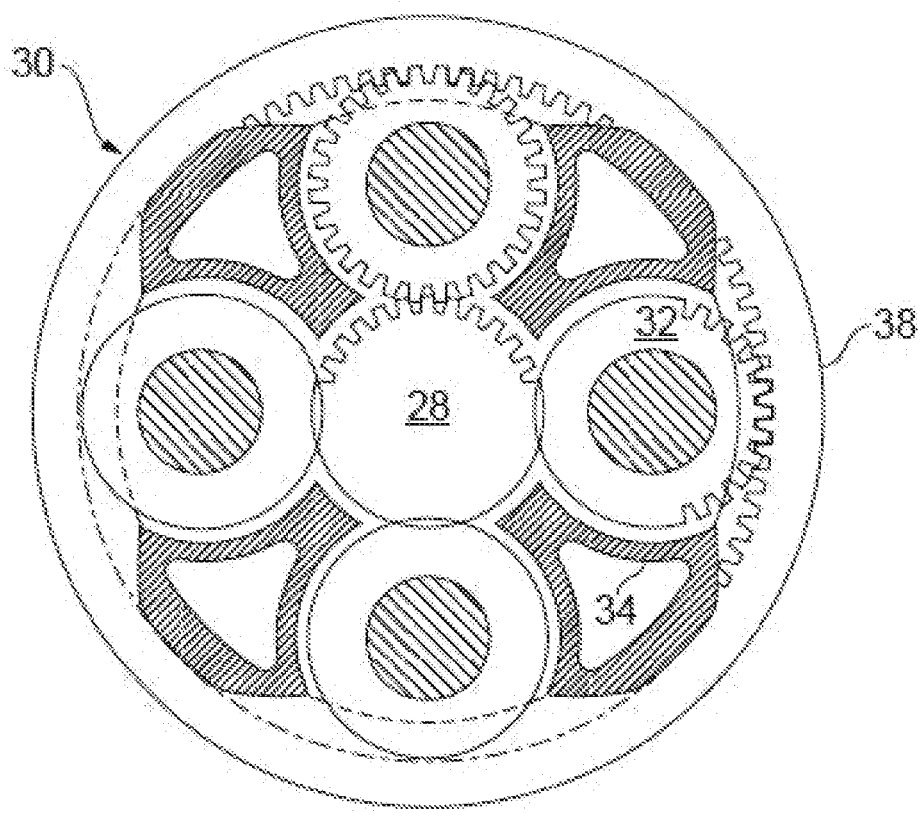
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4a

Figure 4A:
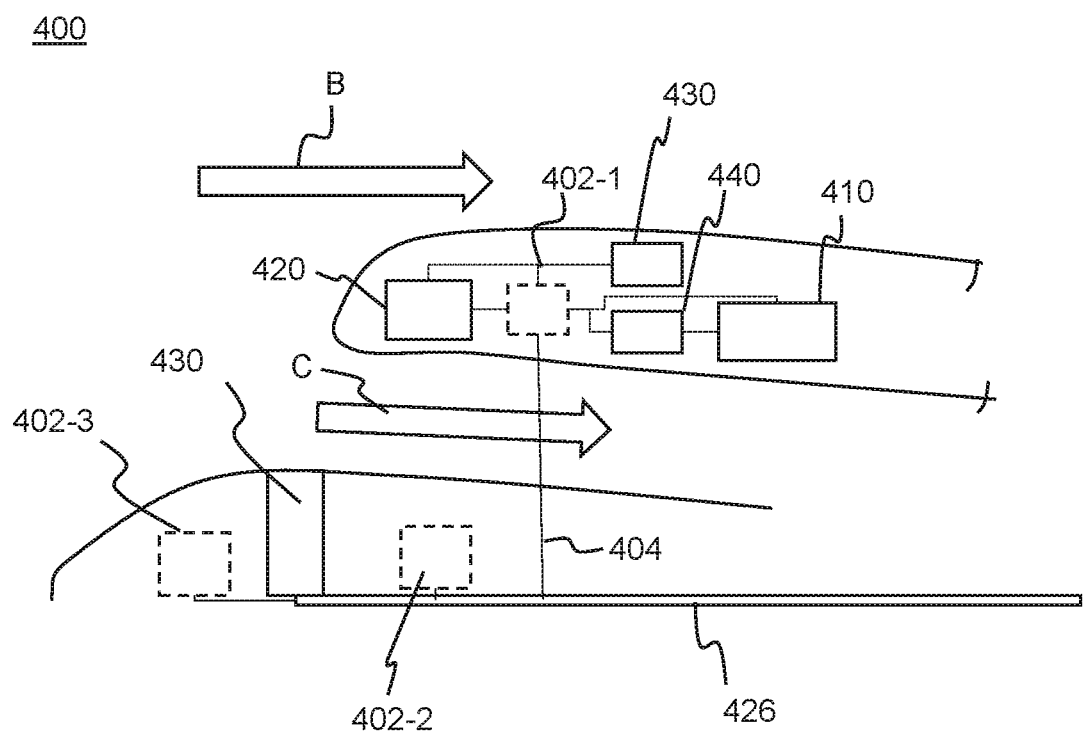
FIG. 4a is a partial schematic cross-section of an example gas turbine including a core fairing and motor locations.

FIG. 4a schematically shows an example set of components of a gas turbine engine (shown partially at 400) associated with rotor bow mitigation. The gas turbine engine 400 may be in accordance with the example gas turbine engine discussed above with reference to FIGS. 1 to 3, with associated components partially reproduced in FIG. 4a. The present disclosure envisages a gas turbine engine incorporating one, some, or any combination of, the components shown and described with respect to FIG. 4a.

The example gas turbine engine comprises an electrically-powered motor 402 configured to rotate a driven spool 426 of the gas turbine engine. Example locations for the electrically-powered motor 402 for a gas turbine engine as disclosed herein are shown in FIG. 4a. A first example location 402-1 for the motor 402 is within a core fairing of the gas turbine engine, which radially surrounds a core flow path C and is radially inboard of a bypass flow path B (which may be bound by a nacelle, not shown). When provided at this location 402-1, the motor may be connected to the spool 426 via an intermediary transmission, for example comprising a shaft 404 extending substantially radially through the core flow (e.g. through a stator vane, such as the "engine stator vane" (expression of the art) in the inlet to the core flow). A second example location 402-2 for the motor 402 is radially inward of the core flow C, for example mounted within a cavity of a core part of the engine, rearward of a gearbox 430 for driving a fan shaft (not shown). In this example location 402-2, the motor may be coupled to the spool 426 directly, or with a relatively compact intermediary transmission. A third example location 402-3 for the motor 402 is radially inward of the core and bypass flows C, forward of the gearbox 430 for driving the fan shaft. It may be that space constraints in such a location are less restrictive than in other areas of the gas turbine engine. When located in this example location 402-3, the motor 402 may be coupled to the driven spool 426 via a shaft extending through the gearbox 430 (for example through the sun gear of the gearbox 430). Other locations within the gas turbine engine are equally possible. In variant examples, there may be no gearbox for driving a fan shaft and the motor may still be located at a location radially inward of a core flow path.

Irrespective of the location for the motor 402, the disclosure envisages the motor 402 being mechanically coupled to a spool of the gas turbine engine (the driven spool) to rotate the driven spool 426.

The example gas turbine engine further comprises a bow controller 410 configured to selectively control the motor 402 to perform a rotor bow mitigation operation as will be described below. The motor 402 may be at any suitable location, for example any of the locations 402-1, 402-2, 402-3 as described above, although an example control coupling is illustrated with the location 402-1 in FIG. 4a.

The bow controller 410 may be a dedicated controller or may be integrated in an engine controller having additional functionality (i.e. not directly related to rotor bow mitigation operation). Such engine controllers are commonly referred to as Electronic Engine Controllers (EEC) in the art. It may be located at any suitable location in the engine, and connected wirelessly or with wired links to any other components of the gas turbine engine with which it interacts as will be further discussed below.

The example gas turbine engine 400 includes an energy storage 440, for example an onboard battery. The example gas turbine engine 400 further comprises a power inlet (not shown) for receiving power from an external power source, such as power received from a ground equipment or a ground power supply (e.g. utility power). In this example, both the energy storage 440 and the power inlet are coupled to the motor 402, such that power from the external power source can be selectively provided to each of the energy storage 440 (for charging) and to the motor 402 for operation, simultaneously and/or individually.

In this particular example, the motor 402 is a compound motor and generator as will be further described below, and the generator 402 is configured to provide power to the energy storage 440. While the disclosure envisages implementations of a gas turbine engine comprising such a compound motor and generator, other implementations are envisaged in which the motor may not be a compound motor and generator. Further implementations are envisaged in which there may be no such energy storage 440 and/or power inlet.

FIG. 4*a* also shows a primary controller 420 configured to conduct a primary function using the motor 402. The primary controller 420 may be a dedicated controller or may be integrated in an engine controller having additional functionality as envisaged above. The primary controller 420 may be integrated with the bow controller 410, both of which may be integrated in an engine controller having additional functionality as envisaged above.

The primary controller 420 is configured to conduct a primary function using the motor 402. The primary function may be a gas turbine start operation in which the motor drives the driven spool to rotate to an ignition speed for engine ignition. In previously considered gas turbine engines, such engine start operations may otherwise be conducted by an air starter which receives a supply of pressurised gas from an external location (e.g. from ground equipment, as will be understood in the context of gas turbine engines for aerospace applications). The motor may be a compound motor and generator, and the primary function may be power generation for powering an airframe pressurization system of the gas turbine engine, or for transferring power to an airframe system. The primary function may be power generation for electrical engine accessories. References herein to a motor are intended to include implementations comprising a compound motor and generator, and the expressions motor and generator may be used interchangeably to refer to the same component with respect to those functions.

An airframe pressurization system may comprise a cabin blower system comprising a compressor configured to pressurise air for supply to an airframe associated with the gas turbine engine. The compressor may be coupled to a blower motor, and the blower motor may be powered by the generator. FIG. 4*a* schematically shows an example airframe pressurization system 430 coupled to the motor 402 at the first example location 402-1.

When the primary function is power generation for transferring power to an airframe system, the transferred power may be used for any suitable airframe purpose. Such airframe purposes may include powering cabin systems, wing de-icing systems and the like.

Previously-considered gas turbine engines may include a generator, for example a generator coupled to an auxiliary gear box. Such previously-considered generators are generally provided for powering local systems onboard the engine, and may be rated for a relatively low rate of power generation not suitable for a primary function as indicated above.

In contrast, to rotate the driven spool of the engine, a motor according to the present disclosure consumes a relatively large amount of power, for example at least 10% of a starting power of the engine (e.g. at least 10% of a starting power of at least 10 kW, or 10% of a starting power of at least 50 kW, or 10% of a starting power of at least 100 kW). The expression "starting power" relates to a power required to accelerate the spool of the engine to a speed suitable for ignition, whereas the power required to rotate the spool for rotor bow mitigation purposes is generally lower. When the motor comprises a compound motor and generator, it may correspondingly be configured for a relatively high of power generation. By providing a multi-functional motor which is configured to conduct a rotor bow mitigation operation and one or more of the primary functions as noted above, the motor can perform multiple roles and alleviate demands as would otherwise be placed on other systems, thereby offsetting any additional weight or complexity associated with provision of the motor for the bow mitigation purpose.

It will be appreciated that in other examples there may be no primary controller, or in variant examples any controller provided for controlling a motor may not be configured to conduct any of the primary functions noted above.

FIG. 4*b*

Figure 4B:
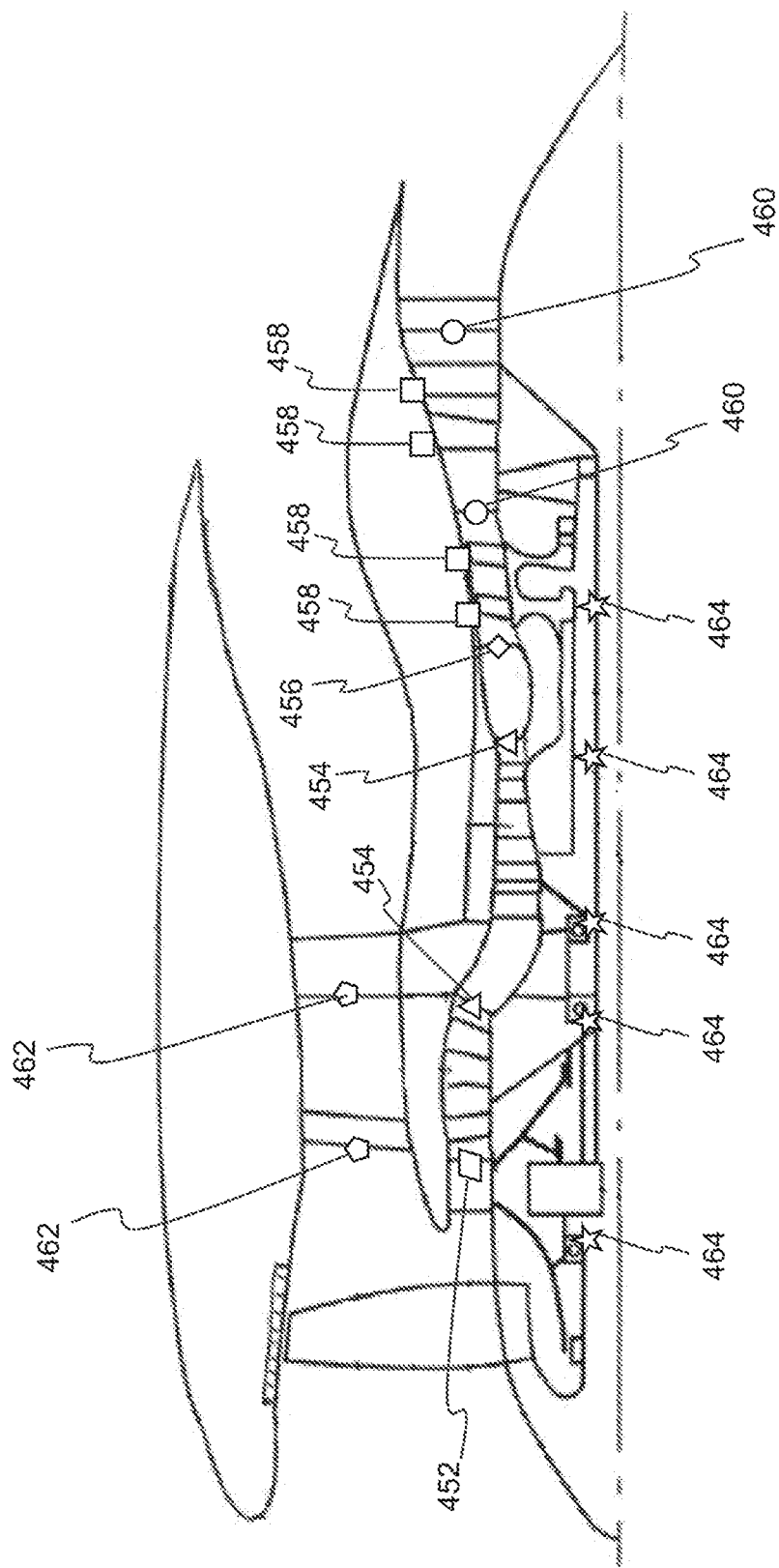
FIG. 4b is a schematic sectional side view of an example gas turbine engine including sensor locations.

FIG. 4*b* shows example sensor locations 452-464. It is presented immediately following FIG. 4*a* owing to the similar view and arrangement of components. However, the particular sensor locations are described in detail elsewhere herein.

Example operations as conducted by the gas turbine engine will now be discussed with reference to FIGS. 5 to 10. These example operations will be discussed with reference to components of the example gas turbine engine 400 as described above with reference to FIG. 4 (with further reference to FIGS. 1 to 3), and any use of reference numerals associated with the example gas turbine engine relate to the reference numerals of FIGS. 1 to 4.

FIG. 5

Figure 5:
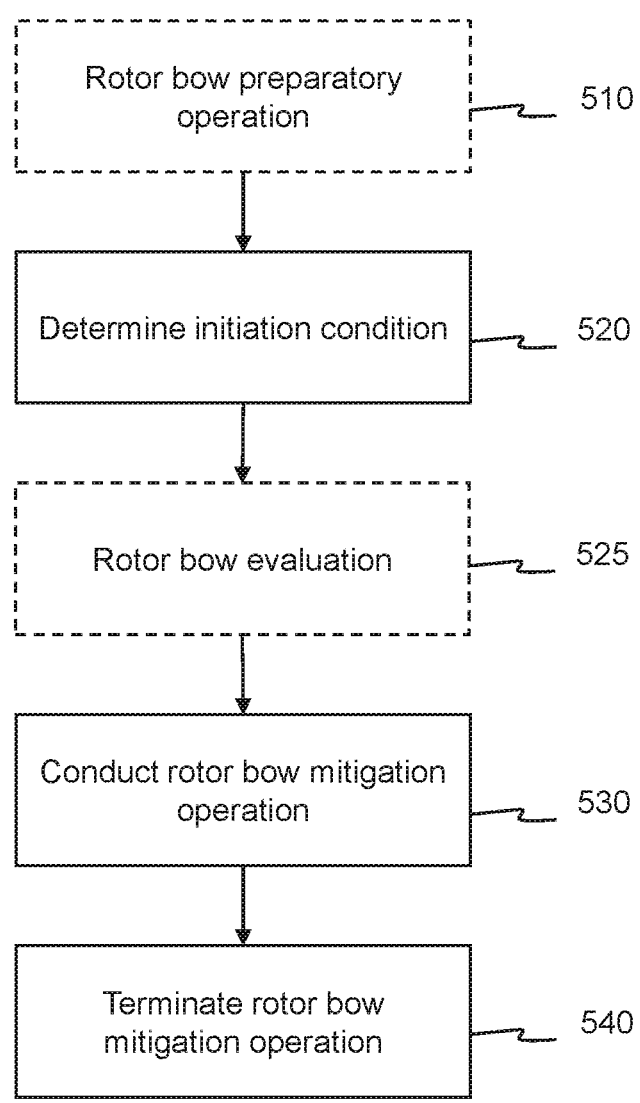
FIG. 5 is a flow chart of a method associated with a rotor bow mitigation operation.

An example method 500 is shown in the flow diagram of FIG. 5 to be conducted by a bow controller 410 (i.e. the bow controller may be configured to conduct the example method 500). At block 510, the method includes conducting a rotor bow preparatory operation, which is conducted before commencement of a rotor bow mitigation operation (e.g. when the gas turbine engine is not in a condition for conducting a rotor bow mitigation operation, such as when the engine is in an in-flight operating state, further examples of which will be discussed below with reference to FIG. 6).

At block 520, the bow controller 410 determines an initiation condition for commencing a rotor bow mitigation operation. An initiation condition corresponds to a stimulus to commence a rotor bow mitigation operation. For example, the initiation condition may be any of: reception, by the bow controller, of a signal to shut down the engine; reception, by the bow controller, of a signal to start the engine; and a determination by the bow controller that conditions for terminating a pre-shutdown phase of an operating plan for the gas turbine engine have been met (as will be discussed in further detail below).

At block 525, the method comprises conducting a rotor bow evaluation to determine a severity of rotor bow and/or a requirement for rotor bow mitigation.

At block 530, the method comprises conducting a rotor bow mitigation operation, as will be discussed in further detail below.

At block 540, the method comprises terminating the rotor bow mitigation operation, as will be discussed in further detail below.

The disclosure envisages that the rotor bow preparatory operation at block 510 and the rotor bow evaluation at 525 are optional. In particular, as will be explained in further detail below, any rotor bow evaluation may be conducted in advance of a rotor bow mitigation operation (e.g. during a rotor bow preparatory operation, or just prior to conducting the rotor bow mitigation operation (as shown in FIG. 5), or during a rotor bow mitigation operation. In some implementations, a rotor bow evaluation may not be conducted.

An operating plan as referred to herein may correspond to a flight mission of an aircraft (e.g. comprising an airframe and one or more gas turbine engines as disclosed herein), for example a flight mission encompassing one or more operating states of the gas turbine engine and/or an associated airframe. Such operating states may include, for example, any of: a start-up state, a (pre-flight) taxi state, a take-off state, an in-flight state, a descent state, an approach state, a (post-flight) taxi state, a ground idle state, a bow mitigation state and a shutdown state. It will be understood that a descent state and an approach state are in-flight states, and therefore correspond to particular phases of operation in the in-flight state (e.g. the gas turbine engine may simultaneously be in the approach state and the in-flight state). It will be understood that the list of states may be non-exhaustive. An operating plan may define a plurality of phases of the flight mission, each phase corresponding to a state.

In the context of a gas turbine engine for non-aerospace applications, an operating plan may correspond to operation at one or more operating states, for example corresponding to a start-up state, various states corresponding to respective phases of energy demand, a bow mitigation state, and a shutdown state.

In a shutdown state, the gas turbine engine is shutdown so that components are not being driven to rotate (although there may be passive windmilling) and fuel/energy is not being consumed for such rotation. Accordingly, a state in which a rotor bow operation is conducted is not referred to herein as a shutdown state, but is instead referred to as a bow mitigation state.

An idle state as used herein is intended to refer to operation of the gas turbine engine at a minimum rotational speed necessary to maintain self-sustaining conditions (i.e. whereby the compressor rotates at a sufficient speed to compress intake air so that expansion of the combusted, compressed intake air generates sufficient power to maintain that speed of the compressor). As will be described in further detail below, the present disclosure envisages generating power using a compound motor and generator. Such power generation may be conducted during any operating state of the engine, other than during a bow mitigation state and a shutdown state. For the purposes of defining the idle state, the minimum rotational speed necessary to maintain self-sustaining conditions (as referenced above) is intended to include maintaining self-sustaining conditions while meeting any power generation demand as noted above. The addition of a requirement for power generation may increase a rate of fuel consumption to maintain the idle speed, and/or the idle speed may be larger when there is a requirement for power generation.

FIG. 6

Figure 6:
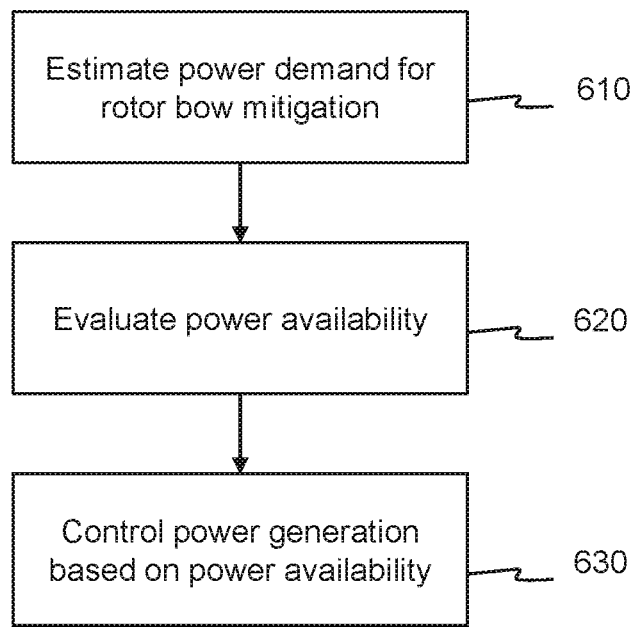
FIG. 6 is a flow chart of method steps relating to power availability for a rotor bow mitigation operation.

As noted above, the rotor bow controller 410 may be configured to conduct a rotor bow preparatory operation 510, an example of which is described with reference to FIG. 6. In this example, the rotor bow preparatory operation is to ensure adequate energy availability for a forthcoming rotor bow operation.

At block 610, the bow controller estimates an energy demand for a rotor bow mitigation operation. The energy demand may be estimated in advance of commencing a rotor bow mitigation operation. For example, the energy demand may be estimated during an earlier phase of an operating plan for the gas turbine engine than a planned shutdown or initiation of a rotor bow mitigation operation. For example, where the gas turbine engine is for an airframe, the energy demand estimation may be initiated based on any of (i) a predetermined time until a predicted event in the operating plan, such as: a landing time; commencement of a phase of operating in the idle state; commencement of a rotor bow operation; and a predicted engine shutdown time; (ii) a predetermined event in the operating plan prior to commencement of a rotor bow operation, for example a start of a descent phase or an approach phase; (iii) a periodic schedule for performing the estimation; and (iv) an on-demand instruction to perform the estimation (e.g. as may be received from a pilot control input or a remote management system).

The energy demand may be estimated by conducting a rotor bow evaluation relating to a severity of rotor bow and/or a requirement for rotor bow mitigation. Such a rotor bow evaluation may be conducted by reference to a thermal condition and/or operational parameter of the gas turbine engine, as will be described in further detail below with reference to FIGS. 7-10.

In variant examples of the gas turbine engine, an energy demand for rotor bow mitigation may be determined without reference to a rotor bow evaluation, for example it may be determined based on historical data relating to previous rotor bow operations of the gas turbine engine and/or corresponding gas turbine engines (for example, based on gas turbine engines of the same type and/or rotor bow operations conducted at the same location and/or rotor bow operations conducted following a comparable operating plan). Alternatively, an energy demand for rotor bow mitigation may be determined based on a predetermined baseline power reserve for rotor bow mitigation, which may be a predetermined value set within the bow controller 410 without reference to any evaluation of rotor bow conditions.

At block 620, the bow controller 410 evaluates a power availability for a rotor bow operation.

The bow controller 410 may determine the power availability by reference to an operational parameter of the gas turbine, in particular a parameter relating to availability of an external power supply at a location for the rotor bow mitigation operation (for example, at a destination airport or a designated stand for the associated aircraft). If the parameter indicates that an external power supply is available, then in block 630 the bow controller may determine no requirement for reserving charge in the energy storage 440 for conducting the rotor bow operation. Alternatively, if the parameter indicates unavailability of an external power supply (which may include uncertainty as to availability of an external power supply), then the bow controller may proceed to evaluate a power availability associated with the energy storage 440. In some examples, there may be no determination of power availability by reference to the operational parameter relating to an external power supply as described above—for example, it may be that the bow controller is not configured to receive such a parameter (or derive it based on received information).

The bow controller 410 may evaluate a state of charge of the energy storage 440 to determine a power availability for the rotor bow mitigation operation. For example, the state of charge may be determined as an amount of energy stored in the energy storage (e.g. in kWh). The bow controller 410 may determine a power availability for the rotor bow mitigation operation based on the state of charge, minus a reserve power allocated for other systems (i.e. not associated with the rotor bow). The bow controller may evaluate the state of charge as a projected state of charge of the energy storage 440 based on a current state of charge of the energy storage and projected consumption and/or charging of the energy storage until a projected start of the rotor bow mitigation operation, based on projected operation of the gas turbine engine (e.g. according to the operating plan).

At block 630, the bow controller 410 controls power generation based on the power availability. The bow controller may be configured so that, if it determines that the power availability for rotor bow mitigation meets or exceeds the determined energy demand, then the bow controller determines that there is no requirement for additional charging of the energy storage 440. The bow controller may be configured so that, if it determines that the power availability for rotor bow mitigation is insufficient to meet the determined energy demand, then the bow controller determines that there is a requirement for additional charging of the energy storage 440 by a determined amount (i.e. an additional charge). The bow controller 410 may be configured to control the gas turbine engine and/or the motor/generator to generate the additional charge, for example by direct control of the engine and/or the motor/generator 402, or by specifying the requirement for additional charging by the additional charge to another controller of the gas turbine engine. The bow controller or other controller may be configured to schedule the generation of the additional charge over the remaining phases of the operating plan, prior to operation in the bow mitigation state. It may be that in some operational scenarios, the additional charge is not yet generated at a time when the gas turbine engine is otherwise ready for transitioning to a rotor bow phase (for conducting the rotor bow mitigation operation). The bow controller or other controller of the gas turbine may be configured so that in such operational scenarios, the gas turbine engine is maintained in an operational state for power generation until the additional charge is generated, and to then permit transitioning to the rotor bow phase upon a determination that the additional charge is generated.

By way of summary, the rotor bow preparatory operation 510 as described above primarily relates to ensuring sufficient power availability for conducting a rotor bow mitigation operation, and optionally comprises determining an energy demand for a rotor bow mitigation operation based on a rotor bow evaluation as described above.

As noted above, the rotor bow preparatory operation 510 may be repeated (e.g. at intervals or upon determination of trigger events) up to transitioning to a rotor bow phase of operation, and this may permit the evaluations of energy demand and power availability to become more accurate as the rotor bow phase of operation becomes closer. As also noted above, in some examples there may be no rotor bow preparatory operation 510 (e.g. the bow controller may not be configured to conduct the operation). In such examples, a lack of sufficient charge may be addressed in alternative ways, for example by suitable definition of the rotor bow mitigation to take into account the available charge.

Returning to the method 500 of FIG. 5, the bow controller 410 determines an initiation condition 520 as described above, after the optional rotor bow preparatory operation 510.

The example method 500 comprises the bow controller conducting a rotor bow evaluation 525, which is to determine a severity of rotor bow and/or a requirement for rotor bow mitigation. The rotor bow evaluation 525 may be conducted as part of the rotor bow preparatory operation (i.e. in advance of the initiation condition) and/or as a separate step in advance of or during the rotor bow mitigation operation, for example upon determination of the initiation condition.

FIG. 7

An example rotor bow evaluation 525 will now be described with reference to FIG. 7.

Figure 7:
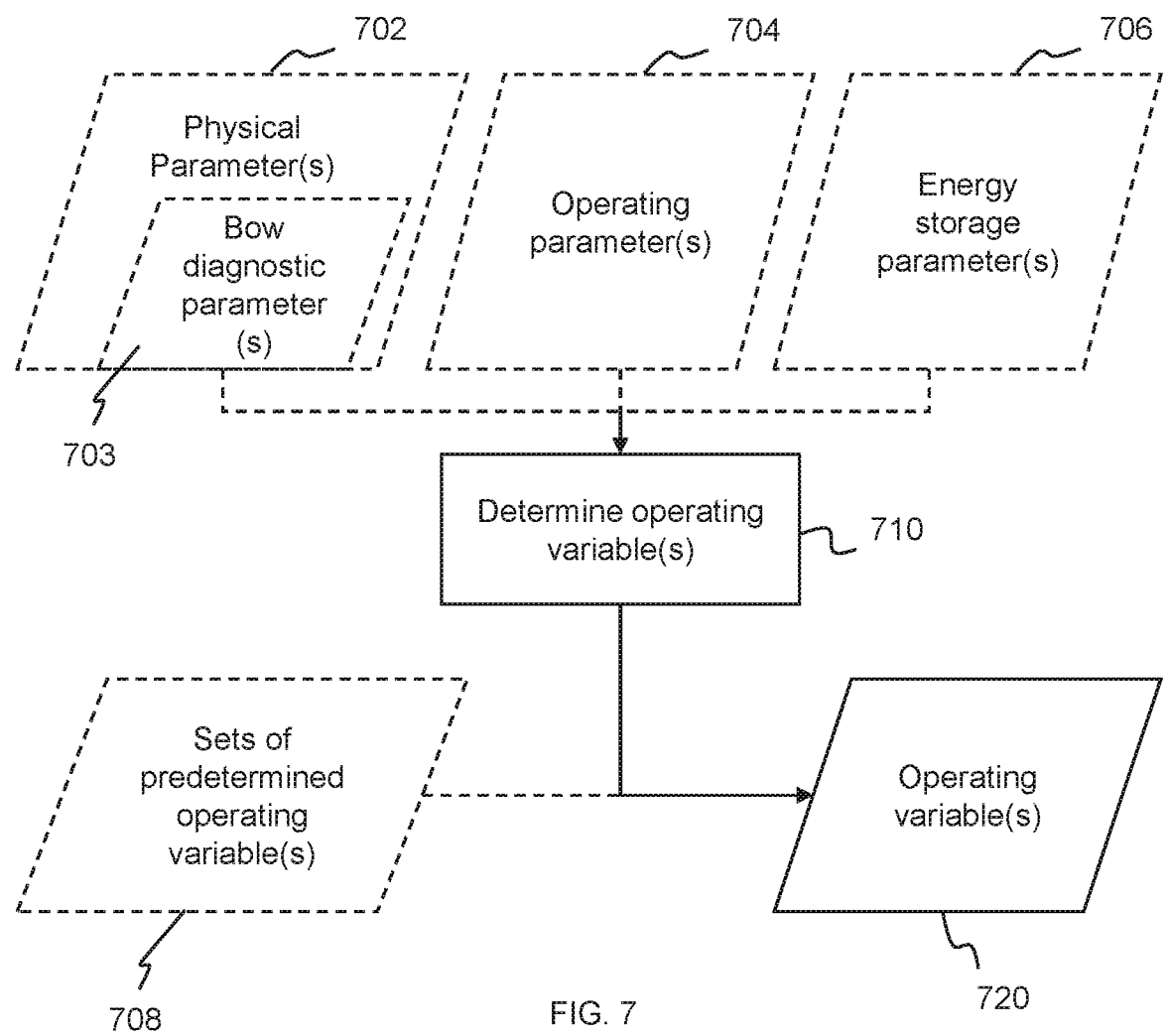
FIG. 7 is a flow chart of a method of determining operating variables.

FIG. 7 shows data blocks 702 (incorporating 703), 704, 706 corresponding to parameters that may be used by the bow controller to determine one or more operating variables 720 for a rotor bow mitigation operation. Such parameters may be referred to as input parameters herein. At block 710, the or each operating variable is determined based on a relationship between the or each input parameter and the respective operating variable.

Although each of the data blocks 702, 703, 704, 706 are shown in FIG. 7, the disclosure envisages determining (at block 710) an operating variable based on one (e.g. only one) or more input parameters, and the one or more input parameters may correspond to one (e.g. only one) or more of the physical parameter(s) 702 (incorporating bow diagnostic parameter(s) 703), operational parameter(s) 704, and energy storage parameter(s). Accordingly, the disclosure envisages implementations in which a relationship is evaluated based only on one or more physical parameters and no other types of input parameters shown in FIG. 7 (i.e. operational parameters or energy storage parameters), or implementations in which a relationship is evaluated based only on one or more operational parameters and no other types of input parameters shown in FIG. 7.

A discussion of relationships between various input parameters and rotor bow effects is provided later in this disclosure, as is a discussion of relationships between operating variables of a rotor bow mitigation operation and rotor bow effects.

The relationship between an input parameter and the or each operating variable may be defined in any suitable way for evaluation. In a relatively simple implementation, the bow controller may refer to a look-up table or mathematical relationship to determine the one or more operating variables. The bow controller may refer to a multi-variable look-up table or mathematical relationship for determining an operating variable, with the multiple variables comprising multiple input parameters as described herein, or at least one input parameter as described herein and another variable.

The or each operating variable may be determined by the bow controller using neural network prediction (i.e. the bow controller may be configured to determine the or each operating variable using neural network prediction). For example, a neural network may be trained with inputs relating to the or each input parameter as described above. The trained neural network may then be used to predict (i.e. determine a value for) the or each respective operating variable based on one or more values of the input parameter(s). Implementations of neural networks are known in the art and so will not be described in detail here.

The one or more operating variables may be determined by selection of a set from a plurality of predetermined sets of one or more operating variables. Each set may define predetermined values for one or more operating variables for the rotor bow mitigation operation, such that selection of the set determines the respective one or more operating variables. As above, the selection of a set from the plurality of predetermined sets may be conducted using neural network prediction.

Some of the sets of the plurality may correspond to various levels of performance with respect to rotor bow mitigation, power (energy) consumption, or a duration of a rotor bow operation. For example, it will be appreciated that a rotor bow operation can be conducted to mitigate rotor bow to varying degrees, for example by reducing non-uniformity in a thermal distribution within the engine to various extents (e.g. as may be measured by reduction of a temperature difference between two components or between two portions of a component). A conservative (low risk) rotor bow mitigation operation may be defined (e.g. based on a respective set of one or more operating variables) so as to conduct relatively more rotor bow mitigation activities (such as rotations of the driven spool) in the same conditions as a baseline rotor bow mitigation operation (e.g. as may be defined based on a respective set of one or more operating variables), thereby enhancing a rotor bow mitigation effect. Enhancing a rotor bow mitigation effect may refer to, for example, reducing a non-uniformity in a thermal distribution in the engine, or reducing a physical effect of rotor bow itself such as a deflection of a component of the spool (as will be discussed below with reference to rotor bow diagnostic parameters). In contrast, when relatively fewer rotor bow mitigation activities are conducted in the same conditions, a rotor bow mitigation effect may be relatively lower (e.g. there may be relatively less reduction in a non-uniformity of a thermal distribution in the engine, or relatively less reduction in a physical effect of rotor bow).

The plurality of sets of predetermined operating variable(s) may comprise a baseline set and one or more of a time priority set; an energy priority set; and an engine health priority set. The baseline set may have any selection of one or more operating variable(s) and serves as a basis for comparison of rotor bow mitigation operations conducted according to the other sets.

As defined elsewhere herein, the time priority set may be defined for promoting relatively faster rotor bow mitigation at a relatively higher rate of power consumption, compared to the baseline set. The energy priority set may be defined to cause a lower net power consumption of a rotor bow mitigation operation. The engine health priority set may be defined to enhance a rotor bow mitigation effect relative to the baseline set.

The expression "relatively faster rotor bow mitigation" relates to a speed at which a rotor bow mitigation effect is achieved. It will be appreciated that a rotor bow mitigation effect may be evaluated in various different ways. For example, a rotor bow mitigation effect may be evaluated by reference to a monitored thermal distribution in the gas turbine engine, a monitored rotor bow diagnostic parameter (as will be discussed elsewhere herein). A rotor bow mitigation effect may be assessed by reference to a bow severity parameter (as will be discussed elsewhere herein), and in particular a reduction in a bow severity parameter.

For example, the time priority set may be defined so that, compared to the baseline set and given the same initial conditions of a gas turbine engine (i.e. at a start of a rotor bow mitigation operation), a rotor bow mitigation operation results in the same reduction in a bow severity parameter in a relatively shorter time and at a relatively higher rate of power consumption. The energy priority set may be defined so that, compared to the baseline set and given the same initial conditions of a gas turbine engine, a rotor bow mitigation operation results in the same reduction in a bow severity parameter at a lower net power consumption, for example by conducting relatively fewer and/or lower energy demand rotor bow mitigation activities, optionally over a longer duration of the rotor bow mitigation operation. The engine health priority set may be defined so that, compared to the baseline set and given the same initial conditions of a gas turbine engine, a rotor bow mitigation operation results in a relatively greater reduction in a bow severity parameter upon termination of the rotor bow mitigation operation. As will be discussed below, an operating variable may specify acceptance criteria (or an acceptance criterion) for terminating the rotor bow mitigation operation, and one or more operating variables may be set in the engine health priority set to effectively apply a more conservative acceptance criterion(-ia) for termination of the rotor bow mitigation operation.

Unless otherwise specified, a reduction in a bow severity parameter as referenced above may not correspond to a total reduction in a bow severity parameter as achieved upon termination of a rotor bow mitigation operation. For example, it may be that the various sets define different acceptance criteria (or an acceptance criterion) corresponding to termination of the rotor bow mitigation operation having achieved mitigated rotor bow to varying degrees. For example, the time priority and/or energy priority sets may be defined to have a relatively less conservative definition of an acceptance criterion (or criteria) as compared with the baseline set and/or an engine health priority set.

The plurality of sets of one or more predetermined operating variables may comprise a plurality of sets that are to be selected according to a respective demand for rotor bow mitigation. For example, the one or more input parameters received by the bow controller may be indicative of a severity of rotor bow, as discussed elsewhere herein. While the same values of an operating variable (or operating variables) may be satisfactorily used for two different rotor bow mitigation operations despite the one or more input parameters being indicative of different demands for rotor bow mitigation (for example, by suitable definition of an acceptance criterion (or criteria) such that the rotor bow mitigation operation associated with mitigating more severe rotor bow ultimately conducts more rotor bow mitigation activities). Nevertheless, it may be advantageous to vary the definition of the or each operating variable based on input parameters indicative of the rotor bow severity. For example, the plurality of sets may be defined so that a first set causes performance of rotor bow mitigation activities at a relatively higher rate of power consumption as compared with a second set (e.g. a baseline set), and the rotor bow controller may be configured to select the first set when the one or more input parameters are indicative of a relatively more severe rotor bow for rotor bow mitigation, and to select the second set when the one or more input parameters are indicative of a relatively lower severity of rotor bow. This may avoid an excessively long duration of rotor bow mitigation operations when there is a relatively high demand for rotor bow mitigation.

As above, a severity of rotor bow mitigation may be determined by reference to a bow severity parameter (as will be discussed elsewhere herein). It is to be understood that references to a rotor bow severity or a bow severity parameter do not imply that a rotor bow state has been observed or is likely occurring, but instead indicate refer to the conditions being suitable for a rotor bow state becoming established in the absence of any mitigating activities, and the severity of that potential rotor bow state.

Examples have been discussed above in which a relationship between the one or more input parameters and the determined one or more operating variables (whether selected from a set of predetermined variables or otherwise) reflects (i) a varying demand for rotor bow mitigation or a varying rotor bow severity; (ii) a time priority; (iii) an energy priority; and (iv) an engine health priority. However, it is to be appreciated that any relationship evaluated by the rotor bow controller, and/or any plurality of sets of predetermined operating variables from which a selection is made, may be defined to reflect other objectives, trends or constraints relating to rotor bow effects, rotor bow mitigation, operational constraints or objectives, and energy-related constraints and objectives. For a better understanding of such objectives, trends, or constraints, a range of input parameters and the associated relevance to a rotor bow state, rotor bow mitigation, operational and energy-related constraints or objectives are discussed below. The discussion of these input parameters is provided in the context of several example methods by which a bow controller may be configured to determine one or more operating variables based on input parameters, as are discussed below with reference to FIGS. 7-10. It is to be appreciated that these examples are not intended to limit any method by which the bow controller may determine an operating variable with any particular set of input parameters, and it is to be appreciated that any of the example methods can be conducted based on any permutation of the input parameters discussed with respect to these examples.

The following discussion is aided by an initial discussion of relevant terminology.

The expression "rotor bow severity" (or "severity of rotor bow") is used herein to refer to a degree to which conditions of a gas turbine engine promote a rotor bow state (otherwise referred to as rotor bow phenomena), such as deflection (e.g. bending) of one or more components associated with a spool of the gas turbine engine. The rotor bow severity relates to the conditions of a gas turbine engine and whether they promote a rotor bow state. Various monitored or determined parameters may be related to or indicative of the rotor bow severity.

In contrast, the expression "bow severity parameter" refers to a parameter which may be determined by the bow controller and/or used in the determination of one or more operating variables, and which reflects an estimated rotor bow severity. Therefore, the bow severity parameter relates to and can be determined by reference to conditions that promote a rotor bow state, and may be considered as a metric of rotor bow severity as used in the methods described herein.

The expression "rotor bow diagnostic parameter" is used herein to refer to a manifestation of a rotor bow state (i.e. a state of the spool or a component of the spool in which rotor bow phenomena has actually occurred), such as a physical symptom or indication of a rotor bow state occurring.

The expression "physical parameters" as used herein refers to parameters which relate to a thermal condition of a gas turbine engine.

Rotor bow severity is considered to be related to thermal conditions within a gas turbine engine. In particular, it is thought that rotor bow occurs owing to (i) convection currents driving hotter air towards upper regions of the cavities of an engine (e.g. the core annulus), leading to a non-uniform thermal distribution; and/or (ii) a non-uniform distribution of air flow through a shut-down gas turbine engine (e.g. flow of ambient air or a windmilling air flow), so as to cause hot spots where there is a relatively low flow rate of air. The rotor bow severity (e.g. the amount of deflection or bending of a component of a spool) is considered to be related to the amount of temperature difference. It is considered that this temperature difference will tend to be larger when the engine has been operated at relatively higher temperatures and/or when relatively higher temperatures persist. Accordingly, rotor bow severity is considered to be related to prevailing temperatures in the engine. It is also considered that a spool may be more susceptible to a rotor bow state if the gas turbine engine has spent a relatively longer duration at an elevated temperature. Accordingly, rotor bow severity is considered to be related to a history of operation, for example a duration of operation at a particular operating state and/or with a monitored temperature in a predetermined range, and/or an elapsed time since such operation.

The expression "physical parameters" as used herein includes each of the following temperature parameters, which may be related to a thermal distribution in the gas turbine engine and therefore a rotor bow severity.

The temperature parameters include: a compressor entry temperature; a compressor exit temperature, a turbine entry temperature, a turbine exit temperature; a compressor blade temperature (rotor or vane); a turbine blade temperature (rotor or vane); a combustion chamber discharge temperature; a bypass duct temperature; an engine spool temperature (corresponding to a monitoring location on an engine spool, for example a monitoring location on a shaft of the spool); a lubricant temperature (e.g. an oil temperature); a fuel temperature; a coolant temperature. Reference numerals in this paragraph indicate suitable locations for respective temperature sensors within the gas turbine engine, as shown in FIG. 4b. Temperature sensors may be of any suitable type. An example type of temperature sensor is a radio frequency temperature sensor.

The bow controller may be configured to determine one or more operating variables for a rotor bow mitigation operation based on one or more of the above temperature parameters. The bow controller may be configured to make the determination based on a relationship between the respective one or more parameters and the one or more operating variables as referenced herein. This may involve direct evaluation of such a relationship, or evaluation of a model based on one or more of the temperature parameters (and/or other physical parameters as discussed herein), as will be discussed in further detail below; and/or evaluation of one or more relationship(s) between one or more outputs of the model and the one or more operating variables. Such a model may correspond to a thermal distribution associated with a rotor bow state of a spool of the gas turbine.

The present disclosure envisages such a relationship and/or model being implemented at various levels of complexity.

At a first level of complexity (as illustrated in FIG. 7 at block 710), the bow controller may be configured to evaluate a single or multivariable relationship between one or more input parameters and one or more operating variables. The relationship may correspond to a thermal distribution associated with a rotor bow state of a spool of the gas turbine by virtue of being defined so that a variation in an input parameter which corresponds to an increase in a non-uniform thermal distribution in the gas turbine engine results in a variation in the one or more operating variables which tends to promote a rotor bow mitigation effect. As a simple example, an operating variable may be a rotational speed of the driven spool in a phase of a rotor bow mitigation operation, and the relationship may be defined so that an increase in a monitored temperature (such as a monitored turbine exit temperature) causes an increase in the rotational speed of the driven spool. As noted elsewhere herein, such a relationship may be implemented by neural network prediction.

As shown in FIGS. 8*a* and 8*b*, it is envisaged that a bow controller may conduct the step of evaluating a relationship or model (block 710 of FIG. 7) at further levels of complexity, as will be described below.

As illustrated in FIG. 8*a*, at a second level of complexity the bow controller may determine a bow severity parameter, corresponding to a predicted severity of a rotor bow state of a spool of the gas turbine engine (block 812), and may determine the one or more operating variables based on the bow severity parameter (block 814).

The bow controller may evaluate a relationship between each input parameter and the bow severity parameter in any suitable way, for example based on a single or multivariable relationship as described above. For example, the bow controller may implement a weighted function which determines the bow severity parameter based on a cumulative influence of a plurality of relationships between respective input parameters and the bow severity parameter. The bow controller may use a points-based evaluation whereby a relationship between each input parameter or each group of input parameters and rotor bow severity is evaluated to determine a respective point value, and a bow severity parameter is determined by evaluating a function based on all of the point values determined for the respective input parameters or groups (for example a summation, weighted sum or average). Accordingly, the bow severity parameter may be determined based on one or more independent relationships between input parameters and rotor bow severity.

The bow severity parameter may be determined by the bow controller using neural network prediction (i.e. the bow controller may be configured to determine the or each operating variable using neural network prediction). For example, a neural network may be trained with inputs relating to the or each input parameter as described above. The trained neural network may then be used to predict (i.e. determine a value for) the bow severity parameter based on one or more values of the input parameters. Implementations of neural networks are known in the art and so will not be described in detail here.

By way of example and with continued reference to example physical parameters, the one or more input parameters used in such an evaluation may comprise (i) a lubricant temperature; (ii) a wind speed at a location for a rotor bow operation; (iii) an ambient temperature at a location for a rotor bow operation; and (iv) a parameter relating to power or torque of the motor, for rotation of the driven spool. As will be appreciated, input parameters (i)-(iii) may be determined in advance of and/or during a rotor bow operation, whereas input parameter (iv) may only be determined during a rotor bow operation.

As noted above, a lubricant temperature may reflect an overall thermal condition of the engine, and as such a relatively higher lubricant temperature may be associated with a relatively higher likelihood of a rotor bow state. In this example, the relationship between the lubricant temperature and the bow severity parameter is such that the bow severity parameter increases (i.e. to reflect a relatively higher severity of rotor bow) with increasing lubricant temperature.

A wind speed at a location for a rotor bow operation is relevant to a thermal condition of an engine, since during a rotor bow operation and any subsequent shutdown state of the gas turbine engine, ambient air may naturally flow through the engine as driven by the wind. Such a flow through the engine may promote diffusion and increase uniformity of a thermal distribution within the gas turbine engine. Such a flow may also result in windmilling (i.e. rotation of rotary components without application of a driving force from the motor), which may serve to prevent components of a spool remaining stationary at a particular angular location for a prolonged period. In this example, the relationship between the wind speed and the bow severity parameter is such that the bow severity parameter decreases (i.e. to reflect a relatively lower severity of rotor bow) with increasing wind speed.

Similarly, a rate of cooling within the gas turbine engine and consequent cooling of any hotspot locations within the gas turbine engine may be related to an ambient temperature at a location for a rotor bow mitigation operation. In this example, the relationship between the ambient temperature and the bow severity parameter is such that the bow severity parameter increases with increasing ambient temperature. The ambient temperature may correspond to a temperature of atmospheric (i.e. outside) air in the context of a gas turbine engine for an airframe. The ambient temperature may correspond to an engine bay temperature, when the gas turbine engine is for installation in an engine bay (e.g. on a ship or industrial installation, or within an aircraft having an embedded engine).

The wind speed and ambient temperature may be determined by suitable sensors provided on the gas turbine engine or an associated airframe (and communicated to the gas turbine engine from an airframe system). The wind speed and ambient temperature may be received by the bow controller from a remote source, for example based on weather data (which may be prevailing weather data or forecast weather data, the latter permitting evaluation of the bow severity parameter in advance of the rotor bow mitigation operation).

A parameter relating to a power or torque of the motor for rotation of the drive spool is an example of a bow diagnostic parameter, as it is considered to reflect a physical symptom or indication of a rotor bow state occurring. In particular, it is considered that a power to rotate the driven spool at a given speed is related to a severity of a rotor bow state, with rotor bow phenomena tending to increase a power to rotate the driven spool. Similarly, the same trend may be manifested in a torque applied on the spool for rotation. The parameter may be determined based on an output signal of the motor, or from a torquemeter attached to the motor or driven spool. In this example, the relationship between the power or torque parameter to the bow severity parameter is such that the bow severity parameter increases with increasing power or torque.

Input parameters (i)-(iv) are examples of input parameters which may be provided to a model evaluated by the bow controller to determine a bow severity parameter. The present disclosure envisages that any suitable combination of input parameters as disclosed herein (including in the appended claims) may be selected for a particular model, and additional input parameters are discussed below and interchangeable with the parameters discussed with respect to this example.

As illustrated in FIG. 8b, at a third level of complexity the bow controller may evaluate a model of thermofluidic conditions in the gas turbine engine based on the one or more physical parameters (as input parameters). The model itself may be implemented at various levels of complexity. For example, the model may be a parametric model that relates the influence of one or more physical parameters to one or more thermofluidic conditions in the gas turbine engine, such as one or more temperatures and/or a predicted thermal distribution associated with a spool. The model may simulate thermofluidic conditions at a plurality of locations in the gas turbine engine. Such a simulation may be a zonal simulation. For example, a zonal simulation may implement parametric relationships between respective physical parameters and one or more thermofluidic conditions for a zone, with further relationships between the zones. Such a simulation may be based on a finite element prediction of a thermal distribution, with a finite element model representing components of the gas turbine engine relevant to rotor bow, such as a spool and cavities in which it is disposed, compressor(s) and turbine(s) (which may be partially attached to the spool).

As will be appreciated by the skilled person, a model of thermofluidic conditions may be defined based on input parameters comprising monitored temperatures in the engine. The model may be configured to determine a thermal distribution and output further parameters relating to temperature conditions (e.g. at other, non-monitored locations) or predicted deflections of components, relevant to rotor bow.

Beyond monitored temperatures (such as the temperature parameters discussed above with reference to FIG. 7), the relevance of other physical parameters as are disclosed herein is discussed below.

In addition to the physical parameters discussed herein which directly relate to a thermal condition of the engine, the model may be configured to receive any operational parameter as disclosed herein (to be discussed below), together with further parameters relating to engine operation and properties. For example, the model may receive an input parameters including one or more spool speed parameters, one or more spool rotor position parameters (e.g. angular or clocking angle parameters), as these parameters may be used to determine thermofluidic conditions such as air flow in or through the gas turbine engine, and the local heat transfer effects on respective parts of a spool.

Returning FIG. 8*b*, the bow controller is configured to evaluate the model of thermofluidic conditions (block 816). The bow controller is configured to determine the one or more operating variables based on one or more outputs of the mode, for example based on a predicted thermal distribution affecting the rotor spool (block 814'). Optionally, the bow controller is configured to, as an intermediate step, determine a bow severity parameter based on one or more outputs of the model (block 812'), with the one or more operating variables being determined at least partly based on the bow severity parameter (block 814').

To model the thermofluidic conditions in the engine, the model is configured to reflect one or more relationships between the input parameters and predicted temperatures in the gas turbine engine. For example, the model may serve as a digital twin of one or more thermodynamic and/or heat exchange phenomena within the engine. Such a model may be implemented at various levels of complexity as discussed above, whereby increasingly complex implementations determine a range of thermodynamic parameters associated with the engine based on a plurality of relevant input parameters. The principles behind development of such a thermal model are considered to be understood in the art and therefore are not discussed in further detail herein.

The model may have as input parameters: any of the temperature parameters disclosed above with respect to FIG. 7; any of the wind speed, ambient temperature and power or torque parameters disclosed above with respect to FIG. 8*a*; and/or any of the physical parameters and/or operational parameters as are discussed below (which are introduced together with disclosure as to example relationships to thermofluidic conditions (e.g. a thermal distribution), a rotor bow state; and/or rotor bow mitigation in a gas turbine engine).

Further input parameters belonging to the set of physical parameters are set out below.

The physical parameters envisaged in this disclosure include one or more pressure parameters relating to air flow through the gas turbine engine. Such pressure parameters are considered to relate to air flow through the gas turbine engine in that the pressures at various locations in the engine is a function of the air flow through the gas turbine engine. Accordingly, the model of thermofluidic conditions can be configured to determine or predict properties of air flow (e.g. flow rates, velocity distribution, direction) through the gas turbine engine based on such pressure parameters, optionally in conjunction with one or more corresponding temperature parameters. Similarly, a relationship for a bow severity parameter and/or one or more operating variables (rather than thermofluidic model) may be defined as a function of one or more such pressure parameters to reflect a physical relationship with rotor bow severity. The pressure parameters may be determined from signals output by one or more pressure sensors located within the engine, for example at an engine inlet (e.g., a fan inlet), a compressor inlet, compressor outlet, combustor outlet, turbine inlet, and turbine outlet. As noted above, corresponding temperature measurements may be provided for those locations using suitably-located temperature sensors.

Referring back to FIG. 4*b*, there is shown a plurality of example sensor locations for sensors to monitor the parameters discussed above. These monitoring locations may be used for any suitable sensor type as described herein, including pressure, vibration, thermal imaging and other sensors as described herein (except those specific to a particular location or location type). Merely as an example, temperature sensors may be provided at each of the sensor locations discussed below.

Different symbols are used to indicate different groups of monitoring locations. Location 452 (trapezoid) is at the entry to the compressor. Locations 454 (triangle) are at the exits of the compressor (intermediate pressure and high pressure respectively). Location 456 (rhombus) is at a discharge of the combustor. Locations 458 (square) are located at or adjacent to (e.g. radially opposing) respective turbine blades and/or stators in the turbine section. Locations 460 (circle) are for monitoring turbine inlet temperature and turbine outlet temperature. They may be disposed in or on a stator (e.g. guide vane) or annulus wall of the turbine section. Locations 462 are mounted on outlet guide vanes and/or support structures in the bypass duct, for monitoring a bypass flow temperature. Locations 464 are disposed along at least one shaft. The disclosure envisages sensor locations along each shaft.

Each of the above sensor locations is optional, and it is possible that temperatures and other parameters as discussed herein are derived for a location (e.g. using a model or relationship as described here) based on other monitored or predicted data.

It may be that compressor blade temperatures are derived from gas temperatures, for example using a model or relationship as described herein based on other monitoring parameters (e.g. temperature parameters).

Additional sensor locations (not shown) include lubricant and fuel monitoring locations. It is to be appreciated that these may be incorporated at any suitable locations in a lubricant and/or fuel pathway (e.g. circulation loop), as is known in the art.

The physical parameters envisaged in this disclosure include other properties of ambient conditions at a location for the rotor bow mitigation operation, beyond the wind speed and ambient temperature as noted above. These include a wind direction at a location for the rotor bow mitigation operation and a humidity at a location for the rotor bow mitigation operation. It will be appreciated that the airflow through a gas turbine as caused by ambient wind conditions may be related to both the velocity and direction of the wind, relative to the orientation of the engine. Accordingly, the wind direction is considered to influence the passive airflow through the engine. It will be appreciated that such airflow may have a natural effect in mitigating rotor bow, both by causing diffusion and distribution of non-uniform thermal distributions, and as such airflow may cause windmilling of rotary components of the gas turbine engine, thereby mitigating rotor bow effects. A thermofluidic model or relationship as envisaged herein may be configured to take into account such an airflow, as determined or predicted based on wind speed and/or wind direction parameters. For example, a rotor bow state may be less likely to arise when there is a significant airflow through the engine, and/or there may be a natural rotor bow mitigation effect arising from such a flow and any associated windmilling. Similarly, a windmilling rotational speed of a spool of the gas turbine engine may be determined, either based on a rotational sensor (i.e. monitoring windmilling rotation) or based on an output of a thermofluidic model as disclosed herein, or based on a relationship with one or more input parameters as disclosed in (e.g. the wind speed and or direction at the location for the rotor bow mitigation operation). A relationship for determining an operating variable of a rotor bow mitigation operation may be defined based on any of the above airflow and/or windmilling parameters. Firstly, any determination of a rotor bow severity and/or thermofluidic conditions may be at least partly based on such input parameters, and therefore the subsequent determination of operating variables for the rotor bow mitigation operation will be based on these input parameters. Secondly, it is envisaged that the operating variables may be defined such that, independently of any estimated rotor bow severity, the rotor bow mitigation operation tends to include relatively fewer rotor bow mitigation activities as any of the above parameters (relating to ambient flow and/or windmilling) are indicative of a significant ambient airflow and/or windmilling effect on the engine, which may perform passive rotor bow mitigation effects (i.e. not requiring active driving of the driven spool). For example, an operating variable specifying a speed, frequency or duration of a rotation event for a rotor bow mitigation operation may be reduced responsive to a trend in any of the above parameters (relating to ambient flow and/or windmilling) which reflects an increase in an ambient airflow and/or windmilling effect on the engine.

A heat transfer and cooling effect of a flow of ambient air through the engine may also be a function of the humidity of the ambient air (e.g. wind), and so a relationship for determining an operating variable, and/or a thermofluidic model as discussed above, may be configured so that the relationship and/or model is at least partly based on a monitored humidity parameter (e.g. as a monitored by a suitable sensor on the gas turbine engine (or associated airframe or installation), or based on a received parameter, e.g. from weather data or an airframe as discussed above).

The above discussion of various physical parameters refers to the influence of airflow through the engine, for example as determined based on one or more monitored pressures (and/or temperatures), monitored or predicted wind or ambient conditions, and monitored rotational speeds of a spool (e.g. in windmilling). Alternatively or additionally, any of the relationships and/or model discussed above may be configured so that it is at least partly based on a monitored flow rate parameter, relating to a flow rate through the gas turbine engine or a part of it (e.g. a flow rate of the core flow, or one or more flow rates through particular parts of the engine, for example an upper and a lower part of a cavity for a compressor or a turbine). A suitable flow sensor may be provided in the gas turbine engine for monitoring such a flow rate parameter, such as an ultrasonic sensor configured to monitor a flow rate of a flow past the sensor. Alternatively, such a flow rate parameter may be derived based on other input parameters and/or as an output from a thermofluidic model, for example based on pressure and temperature sensor data.

The above discussion of various input parameters all relate to physical parameters which may influence thermal conditions in the gas turbine engine, and these may be referred to herein as thermofluidic parameters. Beyond such thermofluidic parameters, the disclosure envisages monitoring bow diagnostic parameters which relate to a manifestation of a rotor bow state, as briefly introduced earlier in this disclosure.

The disclosure envisages use of bow diagnostic parameters in one or more of two principle ways. Firstly, a relationship or model as discussed above in the context of a rotor bow evaluation (i.e. with reference to FIGS. 5 to 8) may use one or more bow diagnostic parameters in the determination of one or more operating variables for a rotor bow mitigation operation, for example by defining a relationship as a function of one or more bow diagnostic parameters as discussed above, by determining a bow severity parameter based on one or more bow diagnostic parameters, and/or by using one or more bow diagnostic parameters as an input to a model as discussed above. In particular, it will be appreciated that since the bow diagnostic parameters provide a metric of a prevailing rotor bow state, any such relationship and/or model which aims to reflect thermal conditions in the gas turbine engine may be improved by reference to a rotor bow diagnostic parameter.

Secondly, as a metric of a prevailing rotor bow state, a bow diagnostic parameter may be defined as a variable in an acceptance criterion or criteria for terminating a rotor bow mitigation operation (in other words, the bow controller may be configured to evaluate an acceptance criterion or criteria based on one or more monitored bow diagnostic parameters). This may provide a more direct assessment of the effectiveness of a rotor bow mitigation operation, as compared with a predicted or assumed effect of rotor bow mitigation activities (such as rotating the driven spool). Evaluation of an acceptance criterion or criteria is to be discussed in a subsequent part of this disclosure.

The above discussion includes relevant disclosure concerning the relationship between a power or torque parameter for rotation of the driven spool and a rotor bow state/rotor bow severity. Beyond this parameter, two further bow diagnostic parameters are set out below.

A further example bow diagnostic parameter is a vibration parameter relating to vibration of a component of the gas turbine engine, for example a component of a spool of the gas turbine engine, or associated with it (e.g. a bearing assembly). Characteristics of such vibration can be indicative of an out-of-balance state of the spool. While an out-of-balance state may be cause by other factors (e.g. a damaged or missing blade), it is also considered to be indicative of a rotor bow state. The size of an amplitude of vibration, relative to a predicted or nominal vibration for a given rotation speed, may increase with an increasingly sever rotor bow state. The gas turbine engine may be equipped with a suitably-located vibration sensor, for example a vibration sensor incorporated with a bearing assembly, or a non-contact vibration sensor at least partly mounted on a static component of the gas turbine engine and configured to interact with a rotatably-mounted counteracting element (i.e. of the sensor, or of a component of the spool). Example vibration sensors include acoustic and piezo sensors.

A further example bow diagnostic parameter is a physical deflection parameter corresponding to a monitored deflection of a spool of the gas turbine engine. The monitored deflection may be a deflection of any component of the spool, for example the shaft, or a connected blade (e.g. a compressor or turbine blade). Such a deflection may be a bending deflection, or a translational deflection as the result of remote bending. Any suitable sensor for monitoring such a deflection may be used. Examples include a radio-frequency sensor (RF) sensor, ultrasonic or eddy current sensor which may be configured to monitor a proximity (or clearance) of a component, such as a proximity of a rotor blade relative to a casing. Variation in the proximity/clearance is directly related to deflection (i.e. a change of proximity), and the sensor and/or bow controller may be configured to monitor deflection (i.e. a chance of proximity) based on an output of the sensor. There may be a plurality of sensors for monitoring a physical deflection parameter at axially and/or angularly-distributed positions along the engine. For example, angularly-distributed sensors may be provided for monitoring a physical deflection at different angular locations associated with a spool (e.g. installed in a casing for monitoring blade deflection at distributed angular positions). The bow controller may be configured to evaluate a model of thermofluidic conditions based on signals from such a plurality of sensors, for example to determine thermal expansion of components at respective positions, and thereby evaluate parameters relating to rotor bow severity, and/or validate or adjust predicted thermal distributions in the model to conform to the monitored deflections (e.g. so that predicted deflections conform to the monitored deflections). A further example location for a deflection sensor is in association with a thrust bearing for a spool of the gas turbine, as axial deflection of the thrust bearing may be indicative of a rotor bow state.

In addition to various sensors described in the context of the various input parameters disclosed above, one or more of the parameters may be determined using further sensor types as set out below.

The gas turbine engine may comprise thermal imaging sensors positioned to monitor components of the gas turbine engine, and the bow controller may be configured to derive temperature parameters associated with such components or portions of the engine for use in any of the relationships and/or models described above using such thermal imaging sensors.

The gas turbine engine may comprise thermal or visual imaging sensors positioned to image a clearance or gap between components (e.g. including a component associated with a spool), and the bow controller may be configured to determine a physical deflection parameter associated with the respective spool based on an output of the thermal or visual imaging sensor.

As discussed above with reference to each of FIGS. 7, 8a and 8b, the determination of the one or more operating variables (blocks 710, 814, 814' respectively) may be based on relationships between the one or more input parameters and the operating variables, and/or between one or more derived parameters from a model and the operating variables.

The following disclosure provides examples of operating variables of a rotor bow mitigation operation, and how they may be defined based on the relationships or models discussed above, or based on operational parameters (including energy parameters), to be discussed below.

By way of introduction, operating variables of a rotor bow mitigation operation refer to the variables that determine how the rotor bow mitigation operation is conducted. Examples include: (1) a duration of the rotor bow mitigation operation; (2) a duration of a continuous phase of the rotor bow mitigation operation (i.e. in which the driven spool is caused to rotate continuously as opposed to intermittently); (3) a duration of an intermittent phase of the rotor bow mitigation operation; (4) an acceptance parameter defining an acceptance criterion for termination of the rotor bow mitigation operation or a phase of the rotor bow mitigation operation; (5) a rotation state for the rotor bow mitigation operation or any phase of the rotor bow mitigation operation, selectable from continuous and intermittent; (6) a frequency of intermittent rotation; (7) a turning angle for intermittent rotation (i.e. of each intermittent rotation action); (8) a rotational speed or power for intermittent rotation; (9) a rotational speed or power for continuous rotation; (10) a parameter defining a tapering profile of rotational speed or power for continuous rotation; (11) a parameter defining a tapering frequency of intermittent rotation.

As discussed above, the physical parameters (including any derived thermofluidic or deflection parameter, and bow diagnostic parameters) may be indicative of a severity of rotor bow. The disclosure envisages that the bow controller may be configured to adjust the operating variables of a rotor bow mitigation operation based on such parameters, as will be discussed below with reference to FIG. 9.

However, the disclosure also envisages that the bow controller may be configured so that the operating variables may not change based on the physical parameters. In such examples, the controller may still be configured to conduct a rotor bow mitigation operation differently when there are different thermal conditions in the gas turbine (e.g. more or less severe for rotor bow). For example, an acceptance criterion or criteria may be defined so that the rotor bow mitigation operation terminates when the particular criterion or criteria is met, such that while variables defining the rotor bow mitigation operation do not vary, it may nevertheless run for different proportions of time.

Further, the disclosure envisages that the bow controller is configured so that the operating variables of the rotor bow mitigation operation are determined based on other parameters, including operational parameters of the gas turbine engine (including energy parameters), as will be discussed further below.

FIG. 9

Figure 9A:
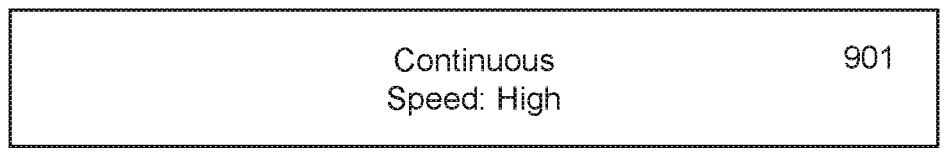
FIG. 9a schematically shows phases of rotor bow mitigation operations.
Figure 9A:
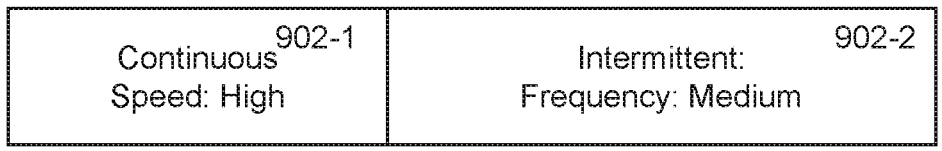
Figure 9A:
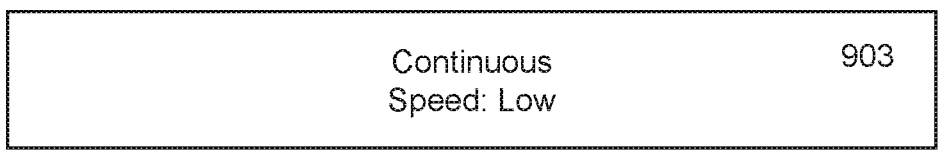
Figure 9A:
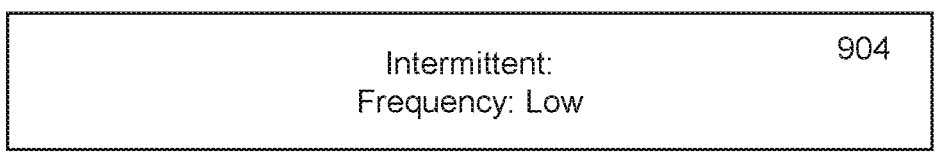

By way of example, FIG. 9a schematically shows four example rotor bow mitigation operations 901, 902, 903, 904. Each operation comprises at least one phase, and the lateral extent of the operation is representative of a time duration of the operation. The first rotor bow mitigation operation 901 comprises a single phase, which is a continuous phase in which the driven spool is driven to rotate at a constant high speed or power (i.e. relatively high, as compared with other speeds or powers discussed below). The second rotor bow mitigation operation 902 comprises two phases: a first continuous phase 902-1 at high speed or power, and a second intermittent phase 902-2, conducted at a medium frequency of intermittent rotation (to be understood as a medium frequency as compared with relatively higher and/or lower frequencies as envisaged in the example). The third rotor bow mitigation operation 903 comprises a single phase, which is a continuous phase in which the driven spool is driven to rotate at a constant low speed or power (i.e. relatively low, considering the high speed or power noted above). The fourth rotor bow mitigation operation 904 comprises a single phase, which is an intermediate rotation phase at low frequency.

It is considered that rotor bow mitigation effects are enhanced by continuous rotation as opposed to intermittent rotation, although continuous rotation requires more power. Further, as will be readily understood rotation at a higher speed or power (continuous or intermittent rotation) consumes more power but enhances rotor bow mitigation effects. Further, it is considered that a higher frequency of intermittent rotation enhances rotor bow mitigation effects.

In the absence of an acceptance criterion or criteria defining termination of a rotor bow mitigation operation (or respective phase), a time duration of the operation (or a respective phase) can be set as an operating variable of the rotor bow mitigation operation, or a minimum time duration may be set in conjunction with an acceptance criterion.

For simplicity, FIG. 9a illustrates each of the operations 901-904 as having a similar total time duration, although it will be appreciated that in other examples these durations may vary.

The four example rotor bow mitigation operations are in decreasing order according to which is considered to enhance rotor bow mitigation effects to the greater extent per unit time. These are merely examples, and other operating variables of a rotor bow mitigation operation (or a respective phase) are envisaged in the disclosure. For example, the bow controller may define a tapering profile of rotational speed or power for continuous rotation. It is considered that this may provide a rotor bow mitigation effect which is initially relatively high commensurate with relatively hot and non-uniform thermal distribution in the gas turbine engine, and which progressively reduces to reflect a reduced rotor bow severity during the operation.

The bow controller may be configured to select operating variables defining each of these example rotor bow mitigation operations (and others) based on the one or more physical parameters relating to thermal conditions of the gas turbine engine as discussed above. The bow controller may be configured to determine a value of an operating variable (e.g. a continuous or intermittent setting, a speed/power, frequency, time duration) based on the one or more physical parameters, for example such that when the physical parameters are indicative of relatively higher rotor bow severity, operating variables that promote rotor bow mitigation effects to a relatively greater degree are selected.

For example, the bow controller may be configured so that when the one or more physical parameters are indicative of a relatively high rotor bow severity, it defines one or more operating variables corresponding to the first rotor bow mitigation operation 901. The bow controller may be configured so that when the one or more physical parameters are indicative of a relatively low rotor bow severity, it defines one or more operating variables corresponding to a rotor bow mitigation operation having a relatively lower rotor bow mitigation effect per unit time (e.g. any of the second-fourth operations in decreasing order of mitigation effects).

Although it may be possible to mitigate varying severities of rotor bow by conducting a standard rotor bow mitigation procedure until a suitable acceptance criteria is reached, by selecting suitable operating variables as illustrated above, the bow controller may avoid adverse build-up of a rotor bow state as necessary, and conserve energy when this is not necessary. For example, when thermal conditions are such that a relatively sever rotor bow state may become established, it may be advantageous to conduct a relatively energy intensive rotor bow mitigation operation, or such a phase of a rotor bow mitigation operation, to prevent the rotor bow state arising. As in the second rotor bow mitigation operation 902, a subsequent phase may be less energy intensive.

Further, by permitting variation of the operating variables, a rotor bow mitigation operation with a suitable (e.g. practical) time duration may be selected, rather than simply running a standard rotor bow mitigation operation for shorter or longer durations in dependence on an acceptance criterion or determined duration for the operation.

Figure 9B:
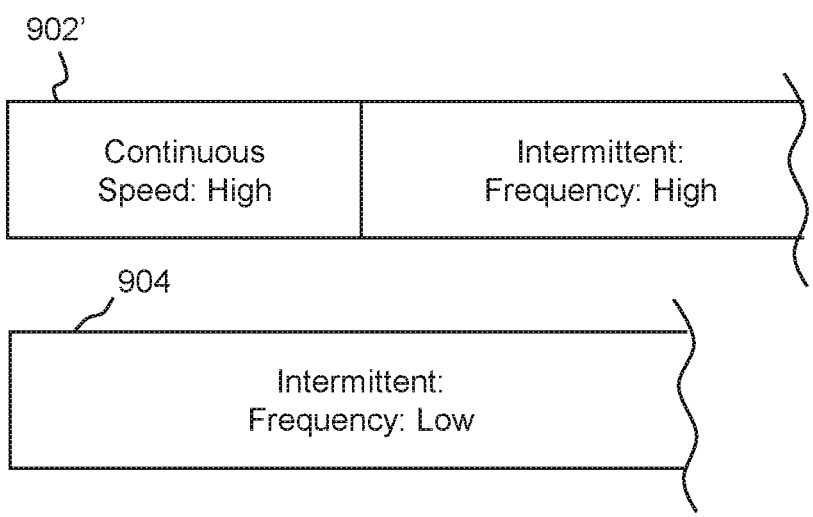
FIG. 9b schematically shows phases of rotor bow mitigation operations.

By way of example, FIG. 9b schematically illustrates variants 902', 904' of the second and fourth rotor bow mitigation operations, shown with indeterminate ends. In this example, the bow controller is configured to evaluate an acceptance criterion for termination of the respective operations (as will be discussed further below).

As discussed above with reference to FIG. 7, the bow controller may be configured to determine the one or more operating variables of the rotor bow mitigation operation by selecting a set of predetermined operating variables from a plurality of sets of predetermined operating variables. These may be considered to define rotor bow mitigation regimes or profiles, suitable for varying amounts of rotor bow severity, or other operational constraints (as will now be discussed).

The disclosure envisages determining one or more operating variables for a rotor bow mitigation operation based on one or more operational parameters relating to the gas turbine engine. As used in this disclosure, the expression "operational parameters" is intended to refer to parameters that relate to the health, serviceability and logistical requirements relating to the gas turbine engine, and which are relevant for determining the operating variables of a suitable rotor bow mitigation operation. For example, the operational parameters may relate to engine health, operating history, an operating schedule, operating resources at a location for a rotor bow mitigation operation, and/or energy storage resources for a rotor bow mitigation operation. The operational parameters are not considered to directly relate to thermal conditions of the engine, and so it may be that an assessment of rotor bow severity does not depend on the operational parameters.

For a better understanding of the operational parameters as envisaged in the disclosure and how the bow controller may be configured to determine one or more operating variables for a rotor bow mitigation operation based on these parameters, each such operational parameter is discussed below in the context of an associated impact on rotor bow mitigation effects, time, and power consumption.

As set out above, various operating variables of a rotor bow mitigation operation can be varied to provide a relatively greater or lesser:
  total rotor bow mitigation effect (i.e. for completed operation);
  rotor bow mitigation effect per unit time;
  rotor bow mitigation effect per unit power consumption.

The total rotor bow mitigation effect can also be influenced by an operating variable which defines an acceptance parameter. For example, a relatively conservative acceptance parameter may be defined (e.g., corresponding to a relatively greater amount of rotor bow mitigation activities), and will tend to result in relatively more rotor bow mitigation effects at the cost of a greater time and/or power consumption of the operation. Conversely, a relatively less conservative acceptance parameter can be defined, and will tend to result in relatively less rotor bow mitigation effects, with a shorter time and/or power consumption of the operation.

The bow controller may be configured to determine the one or more operating variables for the rotor bow mitigation operation based on any combination of the operational parameters discussed below.

A first group of operational parameters relate to engine health and serviceability.

The operational parameters in the first group include a parameter from an engine health monitoring system relating to a degradation or performance metric of a component associated with a spool of a gas turbine. For example, the engine health monitoring system may contain a record of a monitored or predicted fault or degradation of a component, such as monitored or predicted wear of a rotor blade or a parameter relating to a cumulative operating life of a spool or associated components. The parameter is considered to be indicative of a relative risk of an adverse impact of a rotor bow state (e.g. on component wear, fatigue, or servicing requirement), if permitted to arise.

The operational parameters in the first group include a parameter relating to a maintenance history of the gas turbine engine, and a parameter relating to a history of rotor bow events of the gas turbine engine and/or an associate fleet of gas turbine engines. Such parameters are considered to be indicative of a relative risk of an adverse impact of a rotor bow state, reflecting empirical data of such previous adverse impacts.

The operational parameters in the first group include a parameter relating to maintenance service availability at a location for the rotor bow mitigation operation. It is considered that an adverse impact of a rotor bow event at a location with maintenance service availability may be relatively lower as remedial action may be taken on site. Accordingly, such a parameter is considered to be indicative of a relative risk of an adverse impact of a rotor bow state.

The bow controller may be configured so that when a parameter of this first group is indicative a relatively high risk of an adverse impact of a rotor bow state, one or more operating variables are determined (i.e. a value or setting of such variable(s)) so as to provide a relatively greater total rotor bow mitigation effect, and a correspondingly lower effect for a relatively lower risk. For example, for a relatively high risk, one or more operating variables may be determined to specify any of: a longer duration of a rotor bow mitigation operation, a more conservative acceptance parameter, or a value for an operating variable that promotes an enhanced rotor bow mitigation effect.

A second group of operational parameters relate to recent operating history of the gas turbine engine (e.g. during phases of an operating plan leading to a bow mitigation state) that are related to a rotor bow state arising, for example independently of prevailing thermal conditions in the engine that may be determined by a relationship or model considering monitored or derived physical parameters as discussed above. The recent operating history of the gas turbine engine is related to the time spent at elevated temperatures, and it is considered that when components have spent a relatively greater time at elevated temperatures in a recent period they may be more susceptible to fatigue damage, such that additional loads relating to a non-uniform thermal distribution may be more likely to result in a rotor bow state. Accordingly, an operational parameter relating to recent operating history may be indicative of a rotor bow state being relatively more or less likely to arise. It will be appreciated that the influence of any earlier time spent at elevated temperature or a related operating state of the gas turbine on the likelihood of a rotor bow state arising may be expressed as a function of the time duration at the respective temperature/operating state, and/or the elapsed time since that operation. A relatively greater elapsed time since the respective state is considered to reduce the likelihood of a rotor bow state arising, whereas a relatively shorter elapsed time is considered to increase the likelihood of a rotor bow state arising.

The second group of operational parameters includes: a parameter indicating an operating state of the gas turbine engine, wherein the operating state is selected from: an in-flight state, a descent state, an approach state, a taxi state, a ground idle state and a shutdown state,
- a time duration associated with an operating state of the gas turbine engine, wherein the operating state is selected from: an in-flight state, a descent state, an approach state, a taxi state, a ground idle state and a shutdown state;
- a time duration associated with operation at a predetermined thermal condition, wherein the thermal condition is defined by maintenance of a monitored temperature within a predetermined range;
- an elapsed time since operation at a predetermined thermal condition, wherein the thermal condition is defined by maintenance of a monitored temperature within a predetermined range.

The bow controller may be configured so that when a parameter of this second group is indicative of a relatively higher likelihood of a rotor bow state arising, one or more operating variables are determined so as to provide a relatively greater total rotor bow mitigation effect, and a correspondingly lower effect for a relatively lower risk.

When the bow controller is configured to evaluate a relationship between one or more physical parameters to determine one or more operating variables (which may include evaluating a model of thermofluidic conditions), the relationship or model may additionally be based on an operational parameter of the second group. For example, the bow controller may be configured to correlated predicted temperatures at one or more locations of the gas turbine engine to such parameters relating to the recent operating history.

A third group of operational parameters relate to logistical and time constraints of the gas turbine engine. It may be that a logistical or time constraint is such that it is desirable to conduct a rotor bow mitigation operation more quickly than may otherwise be desirable or is standard, or such that it is preferably to compromise a rotor bow mitigation effect in order to permit a logistical or time constraint to be met.

The third group of operational parameters includes a time until a scheduled engine start operation. The time may be determined by the bow controller based on schedule data received by the bow controller, for example from an airframe, pilot input or a remote management system. The time may be determined based on receipt of an engine start command (i.e. as a zero time indicating immediate engine start requested).

Figure 9C:
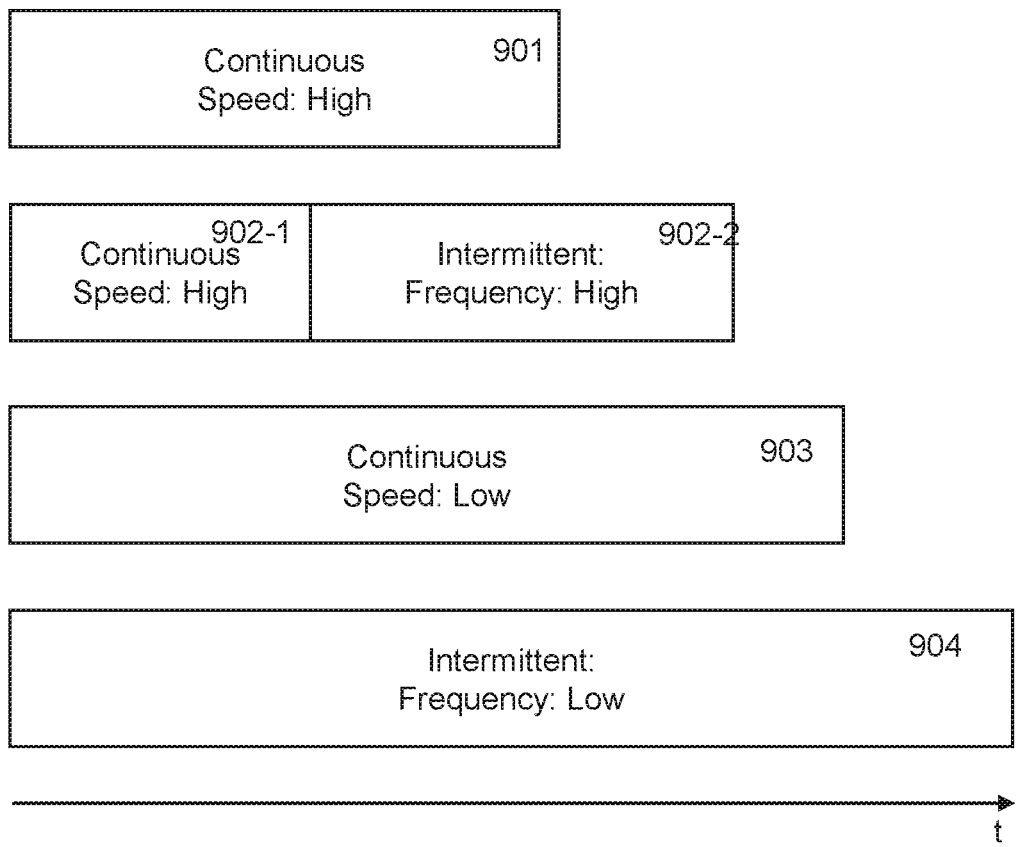
FIG. 9c schematically shows phases of rotor bow mitigation operations.

The bow controller may be configured to determine one or more operating variables that relate to a rotor bow mitigation effect per unit time based on an operational parameter of the third group. For example, the bow controller may be configured to predict a duration of a rotor bow mitigation operation based on a baseline set of operating variables and a rotor bow evaluation as described above, and may be configured so that when the predicted duration is less than time until a scheduled engine start operation, the bow controller may be configured to select one or more operating variables that provides a relatively greater rotor bow mitigation effect per unit time (for example, selecting a relatively higher rotor speed or power, selecting a continuous rotation state for a phase of the operation as opposed to an intermittent state, or selecting a higher frequency of intermittent rotation etc.). FIG. 9c illustrates how the four example rotor bow operations 901-904 having the same rotor bow acceptance criteria may have different total durations.

Further, the bow controller may be configured to determine an acceptance parameter which is relatively less conservative or relatively more conservative based on an operational parameter of the third group.

A fourth group of operational parameters relate to energy availability constraints of the gas turbine engine. As mentioned above, the gas turbine engine may have an energy storage 440 for powering the motor 402.

An example operational parameter in the fourth group is a parameter indicating a status of connection to an external power supply at a location for the rotor bow mitigation operation. A further example operational parameter in the fourth group is a parameter indicating a status of a connection to an external power supply. A further example energy parameter in the fourth group is an energy parameter comprising at least one of: a charge of an energy storage device for the motor, and a discharge capacity of the energy storage device.

As will be appreciated, an availability of an external power supply is indicative of adequate availability of energy. The rotor bow controller may be configured to compare a charge and/or or discharge capacity of an energy storage device with a predicted energy demand for a baseline rotor bow mitigation operation (e.g. based on one or more baseline operating variables, or a predetermined baseline energy demand), and to determine if the energy parameter is indicative of adequate energy availability or insufficient energy availability.

The bow controller may be configured to determine one or more operating variables for the rotor bow mitigation operation which provides a relatively greater rotor bow mitigation effect per unit power consumption when an (or all) operational parameter in the fourth group is indicative of insufficient power availability, and to determine one or more operating variables which provides a relatively lower rotor bow mitigation effect per unit power consumption when an (or any) operational parameter in the fourth group is indicative of adequate power availability. Further, the bow controller may be configured to determine an acceptance parameter which is relatively less conservative when an (or all) operational parameter in the fourth group is indicative of insufficient power availability, and to determine an acceptance parameter which is relatively more conservative when an (or any) operational parameter in the fourth group is indicative of adequate power availability.

The determination of one or more operating variables as set out above may be conducted in advance of a rotor bow mitigation operation or upon initiation of a rotor bow mitigation operation, as set out above. Accordingly, parameters relating to an energy availability may be a predicted energy availability, and the bow controller may be configured to take into account a prevailing state of charge and any predicted discharge or charging until commencement of a rotor bow mitigation operation.

The determination of one or more operating variables as set out above may be conducted concurrently with or subsequent to conducting a rotor bow evaluation, as described above.

FIG. 10

Figure 10:
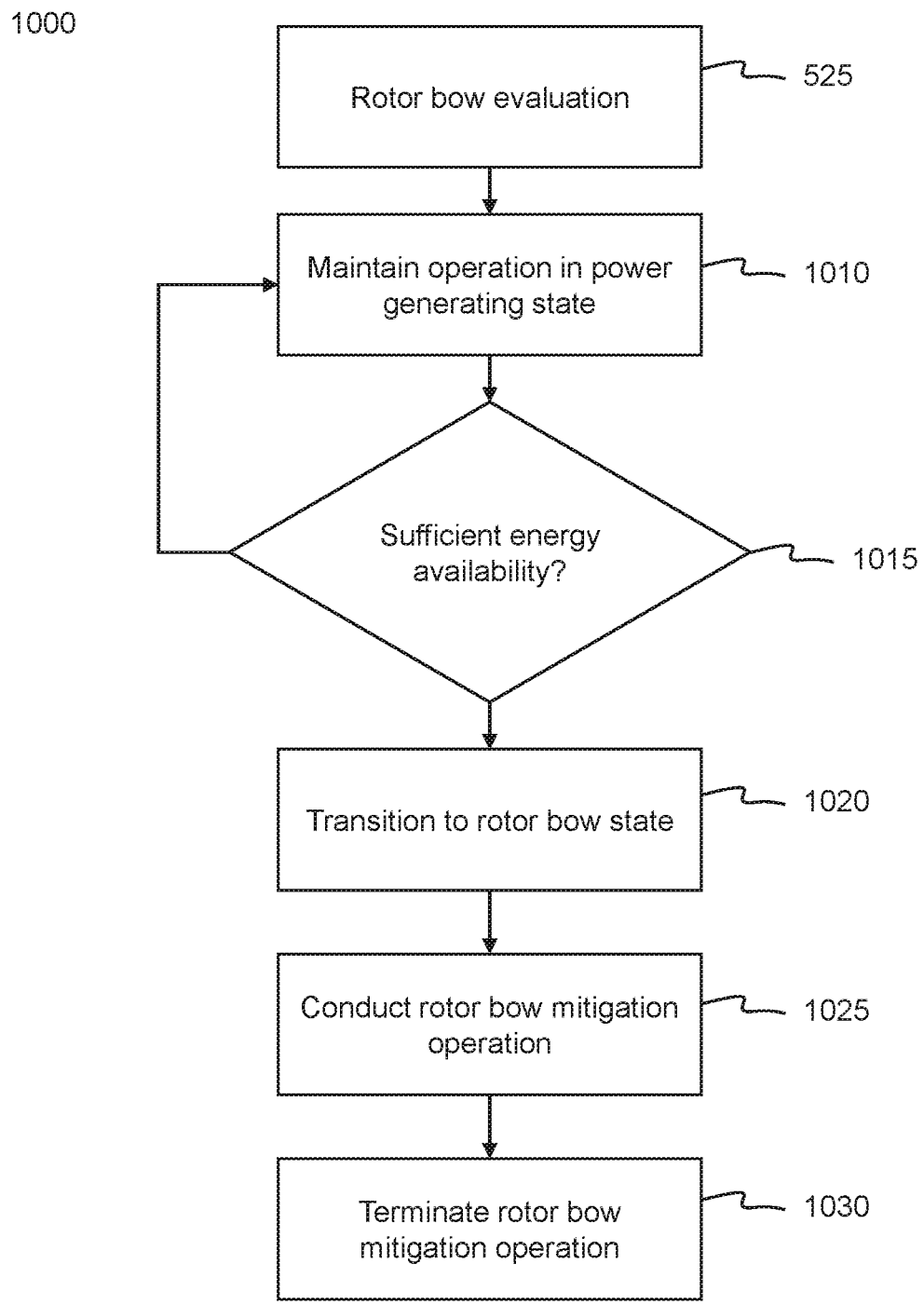
FIG. 10 is a flow chart of a method associated with a rotor bow mitigation operation.

FIG. 10 is a flow diagram of a method 1000 in which the gas turbine engine is selectively maintained in or permitted to exit a power generation state.

In block 525, a rotor bow evaluation is conducted, for example as discussed above. The rotor bow evaluation may be conducted in advance of or upon initiation of a rotor bow mitigation operation, but in this example is conducted in advance during a preceding operating state of an operating plan—in particular a descent state (as defined above). In this example, the method 1000 is initiated responsive to initiation of the descent state.

In this example, the bow controller may be configured to determine a predicted energy demand of a rotor bow mitigation operation, operating variables of which are determined during the rotor bow evaluation 525. As noted above, all states of the gas turbine engine other than a bow mitigation state and a shutdown state may be power generation states in which the motor may be used to generate power to charge the energy storage 440.

In an example scenario, the bow controller determines that the available (or predicted) state of charge of the energy storage 440 upon a planned commencement of the rotor bow mitigation operation is insufficient to meet the predicted energy demand. The bow controller may also determine that there is no external power supply availability at the location for the operation.

In blocks 1010 and 1015, the bow controller maintains operation of the gas turbine engine in a power generation state, and determines whether there is sufficient energy availability. It will be appreciated that, an engine controller of the gas turbine engine will also be maintaining the gas turbine engine in respective states during various phases plan, and so the bow controller would not cause the operating state to switch to a bow mitigation state part way through an aircraft descent when it determines that there is sufficient energy availability.

In this example, the energy storage continues to be charged through a descent and taxi state, and into a ground idle state. During the ground idle state, the bow controller is configured to maintain the gas turbine engine in the ground idle state for power generation (block 1010) despite any reception by a controller of the gas turbine engine of an engine shutdown command. Once the bow controller determines that there is sufficient charge (block 1015), it permits the engine to transition (block 1020) to the rotor bow state for conducting the rotor bow mitigation operation (block 1025). The bow controller is configured to terminate (1030) the rotor bow mitigation operation based on an acceptance criterion or acceptance criteria (to be discussed below).

The controller(s) described herein may comprise a processor. The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller may comprise or the processor may comprise or be in communication with one or more memories that store that data described herein, and/or that store machine readable instructions (e.g. software) for performing the processes and functions described herein (e.g. determinations of parameters and execution of control routines).

The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory, or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware, or be a combination of software and firmware.

References to the methods disclosed herein being conducted (and its various steps including various operations and evaluations) are to be understood as disclosing that the bow controller or other associated controller is configured to conduct the method and/or associated steps.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

What is claimed is:

1. A gas turbine engine comprising:
   an electrically-powered motor configured to rotate a driven spool of the gas turbine engine;
   a primary controller configured to conduct a primary function using the motor, the primary function selected from the group consisting of:
       a gas turbine start operation in which the motor drives the driven spool to rotate to an ignition speed for engine ignition;
       power generation for powering an airframe pressurization system of the gas turbine engine, where the motor is a compound motor and generator; and
       power generation for transferring power to an airframe system, where the motor is a compound motor and generator;
   a bow controller configured to selectively control the motor to perform a rotor bow mitigation operation in which the motor drives the driven spool to rotate to mitigate a non-uniform thermal distribution in a rotor of a spool of the gas turbine engine;
   wherein the rotor bow mitigation operation is variable, and wherein the bow controller is configured to determine one or more operating variables of the rotor bow mitigation operation based on one or more physical parameters relating to a thermal condition of the gas turbine engine, and/or based on one or more operational parameters relating to the gas turbine engine;
   wherein the gas turbine engine is configured to draw power from an energy storage device for the rotor bow mitigation operation, and wherein the bow controller is configured to determine one or more operating variables of the rotor bow mitigation operation based on one or more energy parameters relating to the energy storage device;
   wherein the energy parameter comprises at least one of: a charge of the energy storage device, and a discharge capacity of the energy storage device; and
   wherein the bow controller is configured to determine the one or more operating variables of the rotor bow mitigation operation by selecting between a plurality of sets of one or more predetermined operating variables associated with different rates of power consumption, based on the energy parameter.

2. The gas turbine engine according to claim 1, wherein the motor is disposed:
   radially inwardly of an annular core flow path of the gas turbine engine; or
   radially inwardly of an annular flow path through a fan of the gas turbine engine, and forward of the annular core flow path.

3. The gas turbine engine according to claim 1, wherein the bow controller is configured to monitor one or more bow diagnostic parameters relating to a manifestation of a rotor bow state;
   wherein the bow controller is configured to determine one or more operating variables of the rotor bow mitigation operation based on the bow diagnostic parameter.

4. The gas turbine engine according to claim 3, wherein the or each bow diagnostic parameter is selected from a group consisting of:
   a vibration parameter relating to vibration of a component of the gas turbine engine;
   a parameter relating to power or torque of the motor, for rotation of the driven spool; and
   a physical deflection parameter corresponding to a monitored deflection of a spool of the gas turbine engine.

5. The gas turbine engine according to claim 1, wherein the bow controller is configured to determine a bow severity parameter based on one or more physical parameters relating to a thermal condition of the gas turbine engine;
   wherein the bow severity parameter corresponds to a predicted severity of a rotor bow state of a spool of the gas turbine engine, and
   wherein the bow controller is configured to determine the one or more operating variables based on the bow severity parameter.

6. The gas turbine engine according to claim 1, wherein the bow controller is configured to:
   evaluate a model of thermofluidic conditions in the gas turbine engine based on one or more physical parameters relating to a thermal condition of the gas turbine engine; and
   determine a derived thermofluidic or deflection parameter relating to a rotor bow state based on the model; and
   determine the one or more operating variables of the rotor at least partly based the derived thermofluidic or deflection parameter.

7. The gas turbine engine according to claim 6, wherein the bow controller is configured to evaluate the model to determine the derived thermofluidic or deflection parameter selected from the group consisting of:
   a predicted temperature difference relating to bow of a spool of the gas turbine engine; and
   a predicted deflection parameter relating to bow of a spool of the gas turbine engine.

8. The gas turbine engine of claim 7, wherein the predicted deflection parameter comprises a predicted deflection or an induced load owing to a non-uniform thermal distribution in the gas turbine engine.

9. The gas turbine engine according to claim 6, wherein the bow controller is configured to determine a bow severity parameter at least partly based on the derived thermofluidic or deflection parameter, the bow severity parameter corresponding to a predicted severity of a rotor bow state of a spool of the gas turbine engine; and wherein the bow controller is configured to determine the operating variable based on the bow severity parameter.

10. The gas turbine engine according to claim 1, wherein the or each physical parameter is selected from a group of thermofluidic parameters and/or a group of bow diagnostic parameters, respectively consisting of:

thermofluidic parameters:
  a compressor entry and/or exit temperature;
  a turbine entry and/or exit temperature;
  a compressor and/or or turbine blade or vane temperature;
  a combustion chamber discharge temperature;
  a bypass duct temperature;
  an engine spool temperature;
  a lubricant temperature;
  a fuel temperature;
  a coolant temperature;
  a wind speed at a location for the rotor bow mitigation operation;
  a wind direction at a location for the rotor bow mitigation operation;
  a windmilling rotational speed of a spool of the gas turbine engine;
  a humidity at a location for the rotor bow mitigation operation;
  an ambient temperature at a location for the rotor bow mitigation operation;
  an engine inlet temperature relating to air provided to an inlet of the gas turbine engine;
  an engine inlet pressure relating to air provided to an inlet of the gas turbine engine;
  a pressure parameter relating to air flow through the gas turbine engine;
  a set of pressure parameters corresponding to axially distributed locations through the gas turbine engine;
  a set of temperature parameters corresponding to axially distributed locations through the gas turbine engine
  a flow rate parameter relating to air flow through the gas turbine engine;
  an engine bay temperature, wherein the gas turbine engine is for installation in an engine bay;
  a predicted temperature difference relating to bow of a spool of the gas turbine engine;
  a predicted deflection parameter relating to bow of a spool of the gas turbine engine; and bow diagnostic parameters:
  a vibration parameter relating to vibration of a component of the gas turbine engine;
  a parameter relating to power or torque of the motor, for rotation of the driven spool; and
  a physical deflection parameter corresponding to a monitored deflection of a spool of the gas turbine engine.

11. The gas turbine engine according to claim 1, wherein the one or more operating variables are determined at least partly based on one or more operational parameters relating to engine health, an operating history, an operating schedule, operating resources at a location for a rotor bow mitigation operation, and energy storage resources for a rotor bow mitigation operation.

12. The gas turbine engine according to claim 1, wherein the one or more operational parameters are selected from the group consisting of:

a parameter from an engine health monitoring system relating to a degradation or performance metric of a component associated with a spool of the gas turbine engine;
a parameter relating to maintenance history of the gas turbine engine;
a parameter relating to a history of rotor bow events of the gas turbine engine and/or an associated fleet of gas turbine engines;
a parameter relating to maintenance service availability at a location for the rotor bow mitigation operation;
a parameter indicating an operating state of the gas turbine engine, wherein the operating state is selected from: an in-flight state, a descent state, an approach state, a taxi state, a ground idle state and a shutdown state,
a time duration associated with an operating state of the gas turbine engine, wherein the operating state is selected from: an in-flight state, a descent state, an approach state, a taxi state, a ground idle state and a shutdown state;
a time duration associated with operation at a predetermined thermal condition, wherein the thermal condition is defined by maintenance of a monitored temperature within a predetermined range;
an elapsed time since operation at a predetermined thermal condition, wherein the thermal condition is defined by maintenance of a monitored temperature within a predetermined range;
a time until a scheduled engine start operation;
a parameter relating to availability of an external power supply at a location for the rotor bow mitigation operation;
a parameter indicating a status of connection to an external power supply;
an energy parameter comprising at least one of: a charge of an energy storage device for the motor, and a discharge capacity of the energy storage device.

13. The gas turbine engine according to claim 1, wherein the one or more operating variables of the rotor bow mitigation operation to be determined by the bow controller comprises at least one operating variable selected from the group consisting of:

a duration of the rotor bow mitigation operation;
a duration of a continuous phase of the rotor bow mitigation operation;
a duration of an intermittent phase of the rotor bow mitigation operation;
an acceptance parameter defining an acceptance criterion for termination of the rotor bow mitigation operation or a phase of the rotor bow mitigation operation;
a rotation state selectable from continuous and intermittent;
a frequency of intermittent rotation;
a turning angle of intermittent rotation;
a rotational speed or power for intermittent rotation;
a rotational speed for continuous rotation;
a power for continuous rotation;
a parameter defining a tapering profile of rotational speed or power for continuous rotation;
a parameter defining a tapering frequency of intermittent rotation.

14. The gas turbine engine according to claim 1, wherein the bow controller is configured to determine the one or more operating variables of the rotor bow mitigation operation by selecting between predetermined sets of one or more operating variable for the bow mitigation operation, including:
   a baseline set; and
   a time priority set defined to promote relatively faster rotor bow mitigation at a relatively higher rate of power consumption compared to the baseline set; and/or
   an energy priority set defined to cause a relatively lower net power consumption of a rotor bow mitigation operation compared to the baseline set; and/or
   an engine health priority set to enhance a rotor bow mitigation effect relative to the baseline set.

15. The gas turbine engine according to claim 14, wherein the bow controller is configured to:
   select the time priority set based on an operational parameter relating to a time until a scheduled engine start operation;
   select the energy priority set based on an energy parameter relating to an energy storage device for the rotor bow mitigation operation and/or an operational parameter relating to a time until a scheduled engine start operation; and
   select the engine health priority set based on an operational parameter relating to a maintenance history of the gas turbine engine, a parameter relating to maintenance service availability at a location for the rotor bow mitigation operation, and/or a parameter relating to a history of rotor bow events of the gas turbine engine and/or an associated fleet of gas turbine engines.

16. The gas turbine engine according to claim 1, wherein the bow controller is configured to determine termination of the rotor bow mitigation operation based on evaluating a rotor bow acceptance criterion or rotor bow acceptance criteria;
   wherein the bow controller is configured to evaluate the rotor bow acceptance criterion or criteria based on one or more of: a physical parameter relating to a thermal condition of the gas turbine engine, an operational parameter relating to the gas turbine engine, an energy parameter relating to an energy storage device for the rotor bow mitigation operation; a bow diagnostic parameter, and a bow severity parameter determined by the bow controller.

17. The gas turbine engine according to claim 16, wherein the bow controller is configured so that an acceptance parameter of the rotor bow acceptance criterion or rotor bow acceptance criteria is variable to vary a minimum duration or power consumption of the rotor bow mitigation operation; and
   wherein the bow controller is configured to:
      vary the acceptance parameter to reduce the minimum duration based on an operational parameter relating to a time until a scheduled engine start operation;
      vary the acceptance parameter to reduce the power consumption based on an energy parameter relating to an energy storage device for the rotor bow mitigation operation;
      vary, and/or determine to permit or deny variation of, the acceptance parameter based on a parameter relating to maintenance history of the gas turbine engine, a parameter relating to a maintenance service availability at a location for the rotor bow mitigation operation, and/or a parameter relating to a history of rotor bow events of the gas turbine engine and/or an associated fleet of gas turbine engines.

18. A gas turbine engine comprising:
   an electrically-powered motor configured to rotate a driven spool of the gas turbine engine;
   a primary controller configured to conduct a primary function using the motor, the primary function selected from the group consisting of:
      a gas turbine start operation in which the motor drives the driven spool to rotate to an ignition speed for engine ignition;
      power generation for powering an airframe pressurization system of the gas turbine engine, where the motor is a compound motor and generator; and
      power generation for transferring power to an airframe system, where the motor is a compound motor and generator;
   a bow controller configured to selectively control the motor to perform a rotor bow mitigation operation in which the motor drives the driven spool to rotate to mitigate a non-uniform thermal distribution in a rotor of a spool of the gas turbine engine;
   wherein the rotor bow mitigation operation is variable, and wherein the bow controller is configured to determine one or more operating variables of the rotor bow mitigation operation based on one or more physical parameters relating to a thermal condition of the gas turbine engine, and/or based on one or more operational parameters relating to the gas turbine engine;
   wherein the gas turbine engine is configured to draw power from an energy storage device for the rotor bow mitigation operation;
   wherein the bow controller is configured to determine a predicted energy demand for the rotor bow mitigation operation; and
   wherein a controller of the gas turbine engine is configured to:
      selectively operate or maintain the gas turbine engine in a power generation state to provide the energy storage device with sufficient charge to meet the predicted energy demand for the rotor bow mitigation operation; and
      permit or cause transition from the power generation state to a bow mitigation state or shutdown state of the gas turbine engine responsive to determining that the energy storage device has sufficient charge to meet the predicted energy demand for the rotor bow mitigation operation.

* * * * *